US011972889B2

(12) United States Patent
Kobayashi et al.

(10) Patent No.: US 11,972,889 B2
(45) Date of Patent: Apr. 30, 2024

(54) REACTOR

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Takehito Kobayashi, Mie (JP); Kohei Yoshikawa, Mie (JP); Seiji Shitama, Mie (JP); Kazuhiro Inaba, Mie (JP); Naotoshi Furukawa, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 546 days.

(21) Appl. No.: 17/292,999

(22) PCT Filed: Nov. 8, 2019

(86) PCT No.: PCT/JP2019/044005
§ 371 (c)(1),
(2) Date: May 11, 2021

(87) PCT Pub. No.: WO2020/100773
PCT Pub. Date: May 22, 2020

(65) Prior Publication Data

US 2022/0005642 A1 Jan. 6, 2022

(30) Foreign Application Priority Data

Nov. 16, 2018 (JP) ................................ 2018-215466

(51) Int. Cl.
*H01F 27/26* (2006.01)
*H01F 27/02* (2006.01)
(Continued)

(52) U.S. Cl.
CPC ........... *H01F 27/022* (2013.01); *H01F 27/24* (2013.01); *H01F 27/28* (2013.01)

(58) Field of Classification Search
CPC ........ H01F 27/022; H01F 27/24; H01F 27/28; H01F 27/22; H01F 37/00; H01F 27/02;
(Continued)

(56) References Cited

U.S. PATENT DOCUMENTS

| | | | |
|---|---|---|---|
| 6,696,909 B2 * | 2/2004 | Inoue ....................... | H05K 7/02 336/200 |
| 10,283,255 B2 | 5/2019 | Yoshikawa | |

(Continued)

FOREIGN PATENT DOCUMENTS

| | | |
|---|---|---|
| CN | 207038290 U | 2/2018 |
| JP | H01-133712 U | 9/1989 |

(Continued)

OTHER PUBLICATIONS

International Search Report dated Feb. 18, 2020 for WO 2020/100773 A1 (4 pages).

*Primary Examiner* — Mang Tin Bik Lian
(74) *Attorney, Agent, or Firm* — Venjuris, P.C.

(57) ABSTRACT

A reactor is provided with a coil including a pair of winding portions arranged in parallel, a magnetic core to be arranged inside and outside the winding portions, a case for accommodating an assembly including the coil and the magnetic core, a leaf spring fitting for pressing the assembly toward an inner bottom surface of the case, and a sealing resin portion to be filled into the case. Each of the winding portions is so arranged that an arrangement direction of the
(Continued)

winding portions is along a depth direction of the case. The case includes an opening having a rectangular planar shape. The leaf spring fitting is arranged in a state curved toward the inner bottom surface by having both end parts of the leaf spring fitting directly pressed against parts of inner wall surfaces of the case facing each other in a long side direction.

21 Claims, 10 Drawing Sheets

(51) Int. Cl.
*H01F 27/24* (2006.01)
*H01F 27/28* (2006.01)

(58) Field of Classification Search
CPC ........ H01F 27/26; H01F 27/266; H01F 27/30; H01F 27/303; H01F 27/306
See application file for complete search history.

(56) References Cited

U.S. PATENT DOCUMENTS

2004/0226622 A1* 11/2004 Hayashi .................. F16L 27/11 138/121
2009/0108971 A1* 4/2009 Okamoto .............. H01F 27/266 336/65
2010/0102912 A1* 4/2010 Suzuki .................... H01F 37/00 336/65
2011/0102121 A1* 5/2011 Otsuka .................... H01F 27/06 336/200
2012/0044033 A1* 2/2012 Kawaguchi ........... H01F 27/306 336/90
2012/0161911 A1* 6/2012 Moiseev ................. H01F 27/02 336/55
2013/0039815 A1* 2/2013 Murata ................... H01F 27/02 422/129
2013/0162383 A1* 6/2013 Moiseev ............. H01F 27/2804 336/200
2015/0294782 A1* 10/2015 Moiseev ................. H01F 27/22 336/61
2016/0211067 A1 7/2016 Uematsu
2019/0019609 A1* 1/2019 Fujii ....................... H01F 27/24
2019/0355507 A1* 11/2019 Sasaki ..................... H01F 27/02
2020/0235657 A1* 7/2020 Uryu ....................... H01F 27/30

FOREIGN PATENT DOCUMENTS

JP 2010-177439 A 8/2010
JP 2011-029485 A 2/2011
JP 2015-012272 A 1/2015

* cited by examiner

REACTOR

CROSS REFERENCE TO RELATED APPLICATIONS

This application is a national phase of PCT application No. PCT/JP2019/044005, filed on 8 Nov. 2019, which claims priority from Japanese patent application No. 2018-215466, filed on 16 Nov. 2018, all of which are incorporated herein by reference.

TECHNICAL FIELD

The present disclosure relates to a reactor.

BACKGROUND

Patent Document 1 discloses a reactor including a coil, a magnetic core, a case, a sealing resin portion and supporting portions, which are strip-like flat plate fittings. The coil includes a pair of winding portions arranged in parallel. The magnetic core is an annular core arranged inside and outside the winding portions. The case accommodates an assembly of the coil and the magnetic core. The sealing resin portion is filled into the case. The flat plate fittings are arranged to straddle the upper surface of a part of the magnetic core arranged outside the winding portions and located on an opening side of the case. The flat plate fittings are fixed to the case by bolts. These flat plate fittings prevent the detachment of the assembly from the case together with the sealing resin portion.

PRIOR ART DOCUMENT

Patent Document

Patent Document 1: JP 2016-207701 A

SUMMARY OF THE INVENTION

Problems to be Solved

A reactor of the present disclosure is provided with a coil including a pair of winding portions arranged in parallel, a magnetic core to be arranged inside and outside the winding portions, a case for accommodating an assembly including the coil and the magnetic core, a leaf spring fitting for pressing the assembly toward an inner bottom surface of the case, and a sealing resin portion to be filled into the case, wherein each of the winding portions is so arranged that an arrangement direction of the winding portions is along a depth direction of the case, the case includes an opening having a rectangular planar shape, the leaf spring fitting is arranged in a state curved toward the inner bottom surface by having both end parts of the leaf spring fitting directly pressed against parts of inner wall surfaces of the case facing each other in a long side direction, and a pressing part of the leaf spring fitting for pressing the assembly includes a lowermost point of a curved part of the leaf spring fitting in the depth direction of the case.

A reactor of another aspect of the present disclosure is provided with a coil including a pair of winding portions arranged in parallel, a magnetic core to be arranged inside and outside the winding portions, a case for accommodating an assembly including the coil and the magnetic core, a leaf spring fitting for pressing the assembly toward an inner bottom surface of the case, and a sealing resin portion to be filled into the case, wherein each of the winding portions is so arranged that an axial direction of each winding portion is along a depth direction of the case, the case includes an opening having a rectangular planar shape, the leaf spring fitting is arranged in a state curved toward the inner bottom surface by having both end parts of the leaf spring fitting directly pressed against parts of inner wall surfaces of the case facing each other in a long side direction, and a pressing part of the leaf spring fitting for pressing the assembly includes a lowermost point of a curved part of the leaf spring fitting in the depth direction of the case.

A reactor of still another aspect of the present disclosure is provided with a coil including one winding portion, a magnetic core to be arranged inside and outside the winding portion, a case for accommodating an assembly including the coil and the magnetic core, a leaf spring fitting for pressing the assembly toward an inner bottom surface of the case, and a sealing resin portion to be filled into the case, wherein the magnetic core includes an inner leg portion to be arranged inside the winding portion, two outer leg portions for sandwiching some of outer peripheral surfaces of the winding portion, and two coupling portions for sandwiching end surfaces of the winding portion, the winding portion is so arranged that the outer peripheral surfaces face inner wall surfaces of the case, the case includes an opening having a rectangular planar shape, the leaf spring fitting is arranged in a state curved toward the inner bottom surface by having both end parts of the leaf spring fitting directly pressed against parts of the inner wall surfaces facing each other in a long side direction, and a pressing part of the leaf spring fitting for pressing the assembly includes a lowermost point of a curved part of the leaf spring fitting in the depth direction of the case.

DETAILED DESCRIPTION TO EXECUTE THE INVENTION

Technical Problem

Figure 1A:
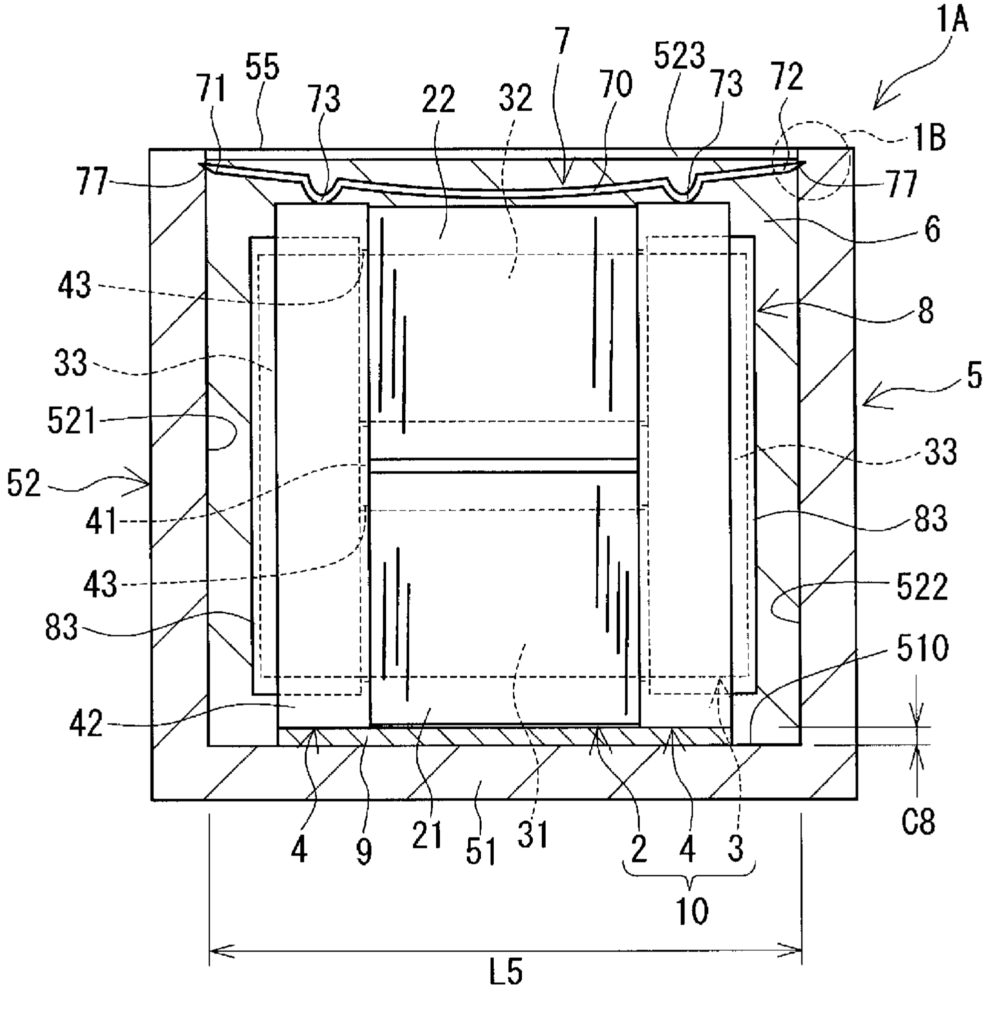
FIG. 1A is a schematic configuration diagram showing a reactor of a first embodiment with a case partially cut.

A reactor small in size and more excellent in heat dissipation is desired.

In the reactor described in Patent Document 1, mounting bases are provided on inner corner parts of the rectangular parallelepiped case. The flat plate fittings are fixed to the mounting bases by the bolts. If the mounting bases are provided in the case, intervals between the outer peripheral surfaces of the assembly and the inner peripheral surfaces of the case become larger as compared to the case where the mounting bases are not provided. In this respect, the reactor is unlikely to be reduced in size. Further, due to the large intervals, the heat of the assembly, particularly the heat of the coil, is unlikely to be transferred to the case. Thus, it is difficult to sufficiently utilize the case as a heat dissipation path in the reactor having the large intervals.

Accordingly, one object of the present disclosure is to provide a reactor small in size and excellent in heat dissipation.

Effect of Present Disclosure

The reactor of the present disclosure is small in size and excellent in heat dissipation.

Description of Embodiments of Present Disclosure

First, embodiments of the present disclosure are listed and described.

(1) A reactor according to a first aspect of the present disclosure is provided with a coil including a pair of winding portions arranged in parallel, a magnetic core to be arranged inside and outside the winding portions, a case for accommodating an assembly including the coil and the magnetic core, a leaf spring fitting for pressing the assembly toward an inner bottom surface of the case, and a sealing resin portion to be filled into the case, wherein each of the winding portions is so arranged that an arrangement direction of the winding portions is along a depth direction of the case, the case includes an opening having a rectangular planar shape, the leaf spring fitting is arranged in a state curved toward the inner bottom surface by having both end parts of the leaf spring fitting directly pressed against parts of inner wall surfaces of the case facing each other in a long side direction, and a pressing part of the leaf spring fitting for pressing the assembly includes a lowermost point of a curved part of the leaf spring fitting in the depth direction of the case.

In the reactor of the present disclosure, the assembly is so accommodated into the case that the arrangement direction of the both winding portions is parallel to the depth direction of the case. That is to say, the both winding portions are so arranged that the arrangement direction of the winding portions is orthogonal to the inner bottom surface of the case in the case. This arrangement mode is called a vertically stacked type below. Note that, in the reactor described in Patent Document 1, the both winding portions are so arranged that both the arrangement direction of the winding portions and the axial directions of the winding portions are parallel to the inner bottom surface of the case. This arrangement mode is called a horizontally placed type below.

The reactor of the first embodiment is small in size and excellent in heat dissipation for the following reasons.

(Small Size)

(a) The case does not include mounting bases to which the leaf spring fitting are bolted. Thus, intervals between the outer peripheral surfaces of the assembly and the inner surfaces of the case tend to be small.

(b) Since the reactor is of the vertically stacked type, it may be possible to reduce an installation area as compared to a reactor of the horizontally placed type. This is described in detail later.

(c) Since the reactor is of the vertically stacked type, it may be possible to reduce a height of the case as compared to a reactor of a second aspect of the present disclosure to be described later.

(Heat Dissipation)

(A) The intervals between the outer peripheral surfaces of the assembly and the inner surfaces of the case are small as described above. Thus, the heat of the assembly is easily transferred to the case.

(B) Since the reactor is of the vertically stacked type, large areas of the both winding portions facing the inner surfaces of the case are easily ensured as compared to the reactor of the horizontally placed type. Therefore, the case can be efficiently utilized as a heat dissipation path.

(C) Since the reactor is of the vertically stacked type, one surface of one winding portion is proximate to the inner bottom surface of the case. Therefore, the heat of the assembly, particularly the heat of the coil, is easily transferred to a bottom portion of the case.

(D) The leaf spring fitting presses the assembly toward the inner bottom surface of the case. Thus, the heat of the assembly is more reliably transferred to the bottom portion of the case.

Further, since the leaf spring fitting presses the assembly toward the inner bottom surface of the case in the reactor of the present disclosure as described above, the detachment of the assembly from the case can be prevented. If the sealing resin portion embeds the assembly and the leaf spring fitting, the detachment of the assembly from the case is more easily prevented.

(2) A reactor according to a second aspect of the present disclosure is provided with a coil including a pair of winding portions arranged in parallel, a magnetic core to be arranged inside and outside the winding portions, a case for accommodating an assembly including the coil and the magnetic core, a leaf spring fitting for pressing the assembly toward an inner bottom surface of the case, and a sealing resin portion to be filled into the case, wherein each of the winding portions is so arranged that an axial direction of each winding portion is along a depth direction of the case, the case includes an opening having a rectangular planar shape, the leaf spring fitting is arranged in a state curved toward the inner bottom surface by having both end parts of the leaf spring fitting directly pressed against parts of inner wall surfaces of the case facing each other in a long side direction, and a pressing part of the leaf spring fitting for pressing the assembly includes a lowermost point of a curved part of the leaf spring fitting in the depth direction of the case.

In the reactor of the second aspect of the present disclosure, the assembly is so accommodated into the case that the axial directions of the both winding portions are parallel to the depth direction of the case. That is to say, the both winding portions are so arranged that the axial directions of the winding portions are orthogonal to the inner bottom surface of the case in the case. This arrangement mode is called an upright type below.

The reactor of the second aspect of the present disclosure is small in size for the above reasons (a) and (b). Particularly, in the reactor of the upright type, it may be possible to reduce an installation area as compared to the above reactor of the vertically stacked type. This is described in detail later. Note that, in the reason (b), the "vertically stacked type" is replaced by the "upright type".

Further, the reactor of the second aspect of the present disclosure is excellent in heat dissipation for the above reasons (A), (B) and (D). Particularly, in the reactor of the upright type, even larger areas of the both winding portions facing the inner surfaces of the case are easily ensured as compared to the above reactor of the vertically stacked type. Therefore, the case is more efficiently utilized as the heat dissipation path. Note that, in the reason (B), the "vertically stacked type" is replaced by the "upright type".

Furthermore, the reactor of the second aspect of the present disclosure can prevent the detachment of the assembly from the case by the pressing of the leaf spring fitting as in the above reactor of the vertically stacked type.

Moreover, in the reactor of the second aspect of the present disclosure, a part to be pressed by the leaf spring fitting is not the coil, but a later-described outer core portion, which is a part of the magnetic core arranged outside the winding portions. In this respect, the reactor of the second aspect of the present disclosure easily enhances electrical insulation between the coil and the leaf spring fitting.

(3) A reactor according to a third aspect of the present disclosure is provided with a coil including one winding portion, a magnetic core to be arranged inside and outside the winding portion, a case for accommodating an assembly including the coil and the magnetic core, a leaf spring fitting for pressing the assembly toward an inner bottom surface of the case, and a sealing resin portion to be filled into the case, wherein the magnetic core includes an inner leg portion to be arranged inside the winding portion, two outer leg portions for sandwiching some of outer peripheral surfaces of the winding portion, and two coupling portions for sandwiching end surfaces of the winding portion, the winding portion is so arranged that the outer peripheral surfaces face inner wall surfaces of the case, the case includes an opening having a rectangular planar shape, the leaf spring fitting is arranged in a state curved toward the inner bottom surface by having both end parts of the leaf spring fitting directly pressed against parts of the inner wall surfaces facing each other in a long side direction, and a pressing part of the leaf spring fitting for pressing the assembly includes a lowermost point of a curved part of the leaf spring fitting in the depth direction of the case.

The reactor of the third aspect of the present disclosure satisfies the following conditions <1>, and <2>.

<1> The assembly is so accommodated into the case that an axial direction of the winding portion is orthogonal to the depth direction of the case and an arrangement direction of the inner leg portion and the both outer leg portions is parallel to the depth direction of the case. This arrangement mode is called a leg vertically stacked type below.

<2> The assembly is so accommodated into the case that the axial direction of the winding portion and the arrangement direction of the inner leg portion and the both outer leg portions are parallel to the depth direction of the case. This arrangement mode is called an upright type below.

Note that an arrangement mode in which the assembly is so accommodated into the case that the axial direction of the winding portion and the arrangement direction of the inner leg portion and the both outer leg portions are orthogonal to the depth direction of the case is called a horizontally placed type.

The reactor of the third aspect of the present disclosure is small in size for the above reasons (a) and (b). Note that, in the reason (b), the "vertically stacked type" is replaced by the "leg vertically stacked type or upright type".

Further, the reactor of the third aspect of the present disclosure is excellent in heat dissipation for the above reasons (A), (B) and (D). Note that, in the reason (B), the "vertically stacked type" is replaced by the "leg vertically stacked type or upright type".

Furthermore, the reactor of the third aspect of the present disclosure can prevent the detachment of the assembly from the case by the leaf spring fitting pressing the assembly toward the inner bottom surface of the case similarly to the above reactors of the first and second aspects of the present disclosure.

Moreover, in the reactor of the third aspect of the present disclosure, a part to be pressed by the leaf spring fitting is not the coil, but the magnetic core as described later. In this respect, the reactor of the third aspect of the present disclosure easily enhances electrical insulation between the coil and the leaf spring fitting.

(4) As one example of the reactor of the present disclosure, each of the both end parts of the leaf spring fitting has an inclined surface, and the inclined surface is inclined to thin the leaf spring fitting from the inner bottom surface side toward the opening side of the case.

In the leaf spring fitting in the above aspect, front and back surfaces except the inclined surfaces have different lengths. Thus, this leaf spring fitting is easily so curved that the surface arranged on the inner bottom surface side of the case is convex. Further, the tips including the inclined surfaces of the leaf spring fitting in the above aspect bite into inner peripheral surfaces of the case. Such a leaf spring fitting reliably presses the assembly toward the inner bottom surface of the case and can maintain a pressing state over a long period of time. Therefore, the above aspect is excellent in heat dissipation and, in addition, can prevent the detachment of the assembly from the case.

(5) As one example of the reactor of the present disclosure, the leaf spring fitting includes a U-shaped projection locally projecting toward the inner bottom surface, and the pressing part of the leaf spring fitting includes the projection.

The leaf spring fitting in the above aspect more reliably presses the assembly toward the inner bottom surface of the case by the projection. Therefore, the above aspect is excellent in heat dissipation and, in addition, can prevent the detachment of the assembly from the case.

(6) As one example of the reactor of the present disclosure, the pressing part of the leaf spring fitting includes a part for directly or indirectly pressing a part of the magnetic core to be arranged outside the winding portion(s).

The reactor of the above aspect easily enhances electrical insulation between the leaf spring fitting and the winding portion(s) as compared to the case where the leaf spring fitting presses the winding portion(s). Indirect pressing realized with an electrically insulating member interposed between the leaf spring fitting and the part of the magnetic core to be pressed by the leaf spring fitting enhances electrical insulation between the leaf spring fitting and the magnetic core. The electrically insulating member may be, for example, a holding member, a resin molded portion or the like to be described later in embodiments.

(7) As one example of the reactor of the present disclosure, the inner wall surface includes a recess for accommodating at least one end part of the leaf spring fitting.

The leaf spring fitting in the above aspect is reliably supported on the inner peripheral surfaces of the case without depending on the presence or absence of the above inclined surfaces by having one end part or both end parts fit into a recess(es) of the case, and is unlikely to be shifted in position. Thus, the leaf spring fitting can maintain the state where the assembly is pressed toward the inner bottom surface of the case over a long period of time. Therefore, the above aspect is excellent in heat dissipation and, in addition, can prevent the detachment of the assembly from the case.

(8) As one example of the reactor of the present disclosure, an adhesive layer is provided which is interposed between the assembly and the inner bottom surface.

In the above aspect, the assembly and the inner bottom surface of the case can be firmly bonded by the adhesive layer. Thus, in the above aspect, the detachment of the assembly from the case is easily prevented even if vibration, a thermal shock or the like occurs when the reactor is used.

(9) As one example of the reactor of the present disclosure, a resin molded portion is provided which at least partially covers the magnetic core.

In the above aspect, the magnetic core can be integrally held by the resin molded portion. Consequently, the assembly is integrated. Thus, the assembly is easily accommodated into the case in a manufacturing process and the above aspect is excellent also in manufacturability.

DETAILS OF EMBODIMENTS OF PRESENT DISCLOSURE

Hereinafter, embodiments of the present disclosure are specifically described with reference to the drawings. The same reference signs in the drawings denote the same named components.

In first and second embodiments, a coil is described to include two winding portions. In third and fourth embodiments, a coil is described to include one winding portion.

First Embodiment

A reactor 1A of the first embodiment is described with reference to FIGS. 1A to 3D.

FIG. 1A is a partial section showing the reactor 1A of the first embodiment in a state where members accommodated in a case 5 are exposed by partially cutting a side wall portion 52 of the case 5 by a plane parallel to a depth direction of the case 5. Here, the case 5, a sealing resin portion 6 and an adhesive layer 9 are partially cut along a cutting line A-A shown in FIG. 2, but an assembly 10 and a leaf spring fitting 7 are not cut. The assembly 10 and the leaf spring fitting 7 are exposed from the sealing resin portion 6. Note that the cutting line A-A is a line on a plane along a long side direction of an opening 55 of the case 5.

Figure 1B:
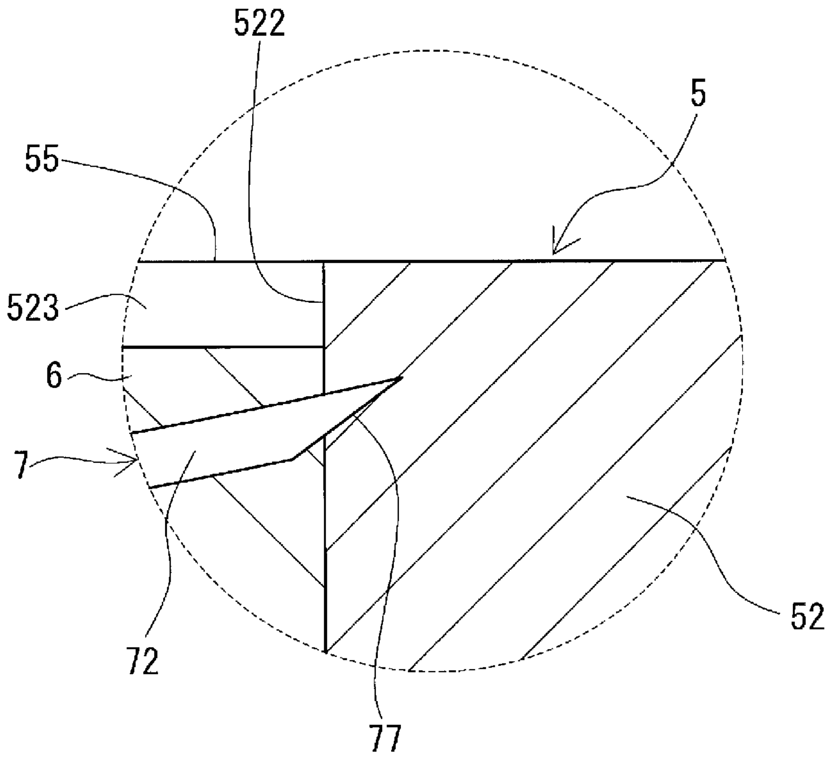
FIG. 1B is a section enlargedly showing the inside of a broken-line circle 1B shown in FIG. 1A.

FIG. 1B is a partial enlarged section enlargedly showing the inside of a broken-line circle 1B of FIG. 1A. FIG. 1B enlargedly shows a part of the side wall portion 52 of the case 5 near an end part 72 of the leaf spring fitting 7 so that a contact state of the end part 72 and an inner wall surface 522 is easily understood.

(Reactor)

SUMMARY

As shown in FIGS. 1A and 1B, the reactor 1A of the first embodiment includes a coil 2, a magnetic core 3, the case 5, the leaf spring fitting 7 and the sealing resin portion 6.

The coil 2 includes a pair of winding portions 21, 22 arranged in parallel. The winding portions 21, 22 arranged in parallel mean the winding portions 21, 22 arranged side by side so that the axes thereof are parallel.

The magnetic core 3 is arranged inside and outside the winding portions 21, 22 and forms an annular closed magnetic path. The magnetic core 3 of this example includes inner core portions 31, 32 to be arranged inside the respective winding portions 21, 22 and outer core portions 33 to be arranged outside the both winding portions 21, 22 (see also FIG. 3A).

The case 5 accommodates an assembly 10 including the coil 2 and the magnetic core 3. The assembly 10 of this example includes holding members 4 and resin molded portions 8 in addition to the coil 2 and the magnetic core 3.

The leaf spring fitting 7 presses the assembly 10 toward an inner bottom surface 510 of the case 5.

The sealing resin portion 6 is filled into the case 5. The sealing resin portion 6 of this example embeds the assembly 10 and the leaf spring fitting 7 accommodated in the case 5.

Such a reactor 1A is typically used with the case 5 mounted on an unillustrated installation object such as a converter case. As an example of an installed state of the reactor 1A, a bottom portion 51 of the case 5 is located on the installation object side and the opening 55 of the case 5 is located on a side opposite to the installation object. The installation object side is a lower side on the plane of FIGS. 1A and 1B. The side opposite to the installation object is an upper side on the plane of FIG. 1A. The installed state can be changed as appropriate.

The reactor 1A of the first embodiment is of a vertically stacked type. In the vertically stacked type, the both winding portions 21, 22 are so arranged in the case 5 that an arrangement direction of the winding portions 21, 22 is along a depth direction of the case 5. Thus, the both winding portions 21, 22 provided in the reactor 1A are so arranged in the case 5 that the arrangement direction is orthogonal to the inner bottom surface 510 of the case 5 and axial directions of the respective winding portions 21, 22 are parallel to the inner bottom surface 510. The arrangement direction is along a vertical direction on the plane of FIG. 1A. The vertically stacked type easily reduces an installation area and, in addition, easily ensures a large heat dissipation area of the coil 2 to the case 5 as compared to a horizontally placed type.

Figure 2:
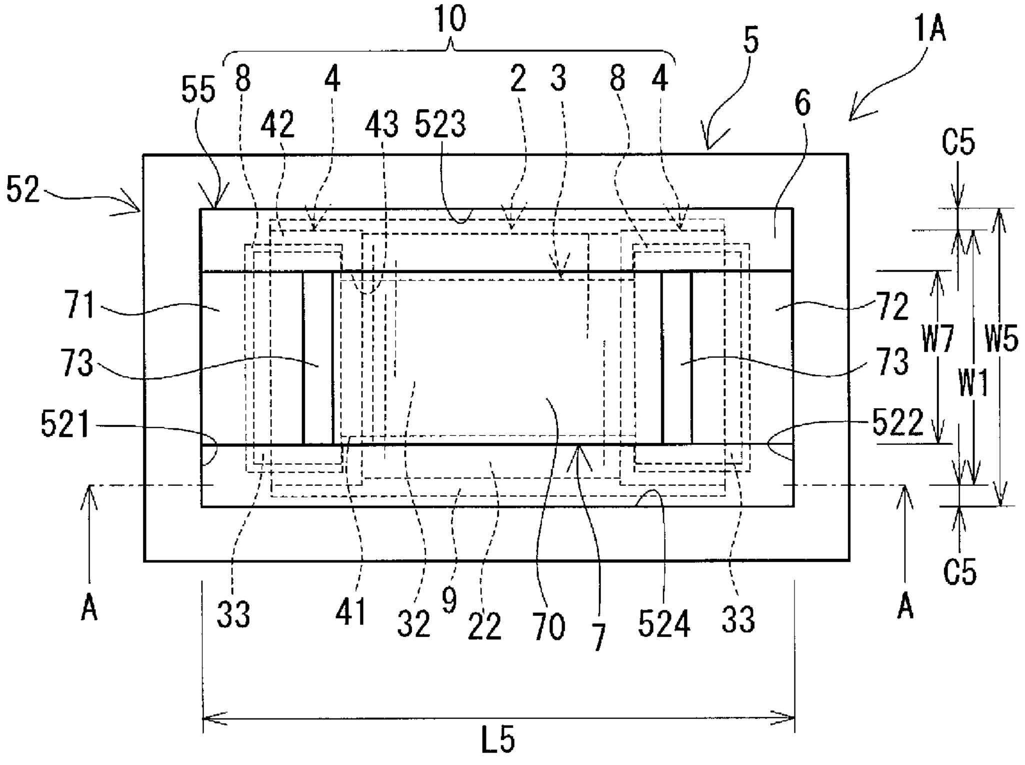
FIG. 2 is a schematic plan view of the reactor of the first embodiment viewed in a depth direction of the case from an opening side of the case.

Further, in the reactor 1A of the first embodiment, the case 5 includes the opening 55 having a rectangular planar shape as shown in FIG. 2. The leaf spring fitting 7 is arranged over the entire length of this rectangular opening 55 in the long side direction. The long side direction is along a lateral direction on the plane of FIG. 2.

Furthermore, the leaf spring fitting 7 is directly supported in the case 5 without being fixed to the case 5 by bolts or the like. In particular, both end parts 71, 72 of the leaf spring fitting 7 are directly pressed against parts of inner wall surfaces of the case 5 facing in the long side direction of the opening 55, i.e. the inner wall surfaces on short sides. By this pressing, the leaf spring fitting 7 is maintained in a state curved toward the inner bottom surface 510 of the case 5 (FIG. 1A). Here, the both end parts 71, 72 are supported on inner wall surfaces 521 and 522 located on both ends in the long side direction. In the reactor 1A, the detachment of the assembly 10 from the case 5 is prevented by pressing the assembly 10 toward the inner bottom surface 510 by the leaf spring fitting 7 convexly curved toward the inner bottom surface 510 (FIG. 1A).

The case 5 can be made smaller by omitting mounting bases for fixing bolts. Thus, in the reactor 1A, the outer peripheral surfaces of the assembly 10 and the inner surfaces of the case 5 are easily brought closer and the heat of the assembly 10, particularly the heat of the coil 2, is easily transferred to the case 5. Also because the leaf spring fitting 7 presses the assembly 10 toward the inner bottom surface 510 of the case 5, the heat of the assembly 10 is easily transferred to the case 5, particularly the bottom portion 51 in the reactor 1A.

Each constituent element is described in detail below.

<Coil>

Figure 3A:
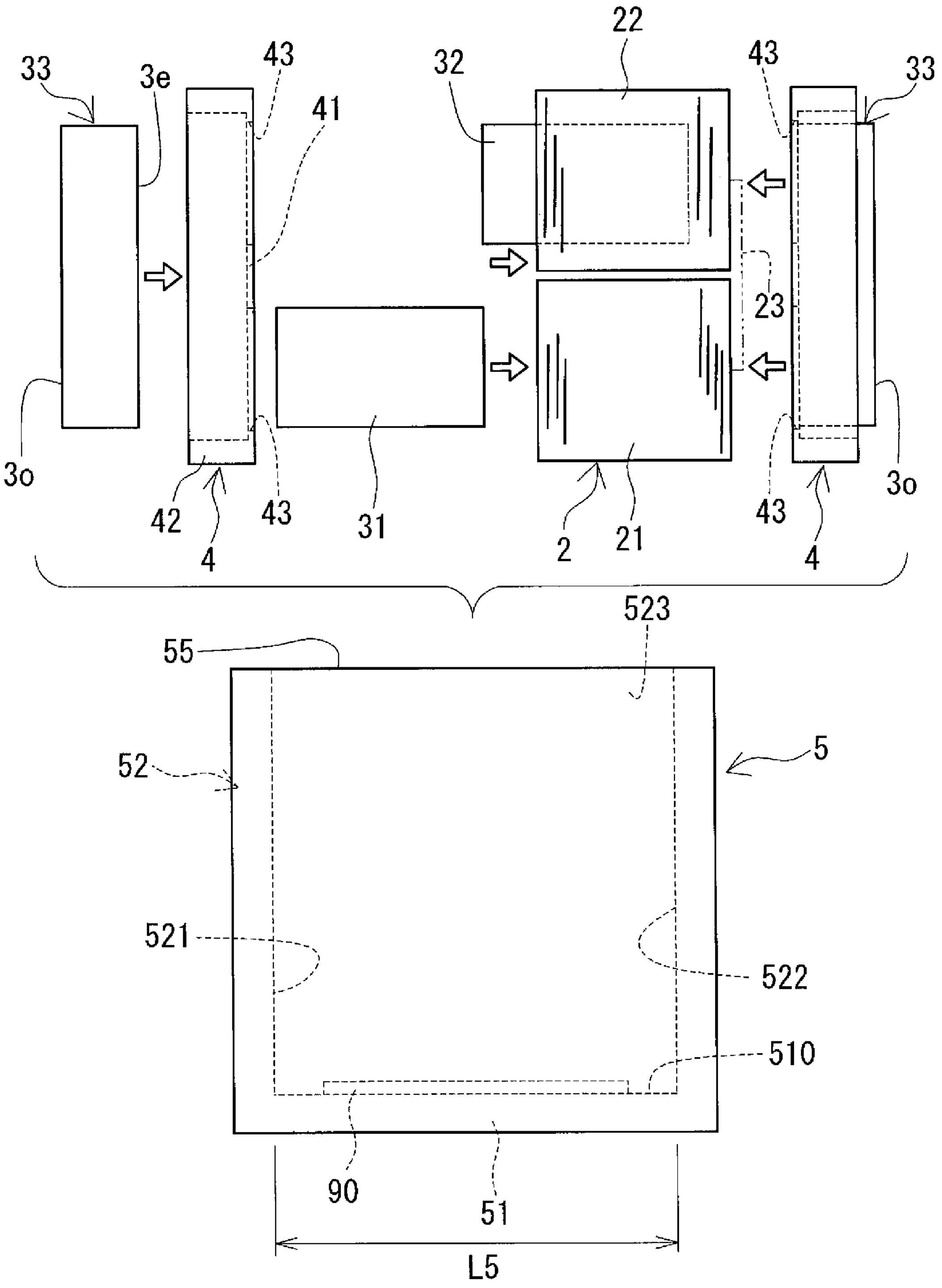
FIG. 3A is a process diagram showing a step of accommodating an assembly into the case in a process for manufacturing the reactor of the first embodiment.

The coil 2 of this example includes two tubular winding portions 21, 22. Further, the coil 2 of this example includes the winding portions 21, 22 and a connecting portion 23 (FIG. 3A) formed from one continuous winding wire. Each of the winding portions 21, 22 is formed by spirally winding the winding wire. The connecting portion 23 is a part for electrically connecting the winding portions 21, 22. The connecting portion 23 of this example is formed by a part of the winding wire extending between the winding portions 21 and 22. FIG. 3A virtually shows the connecting portion 23 by a two-dot chain line. End parts of the winding wire pulled out from the respective winding portions 21, 22 in the coil 2 are utilized as parts to be connected to an external device such as a power supply. The winding wire is not shown in detail.

Examples of the winding wire include a coated wire with a conductor wire and an insulation coating covering the outer periphery of the conductor wire. Examples of a constituent material of the conductor wire includes copper. Examples of a constituent material of the insulation coating include resins such as polyamide-imide. Specific examples of the coated wire include a coated flat rectangular wire having a rectangular cross-sectional shape and a coated round wire having a circular cross-sectional shape. Specific examples of the winding portions 21, 22 made of a flat rectangular wire include edge-wise coils.

The winding portion 21, 22 of this example is an edge-wise coil made of a coated flat rectangular wire and in the form of a rectangular tube such as a rectangular parallelepiped. Thus, the outer peripheral surfaces of each winding portion 21, 22 include four rectangular flat surfaces. Further, in this example, the specifications such as the shapes, winding directions, numbers of turns of the winding portions 21, 22 are equal. The coil 2 in which such winding portions 21, 22 are arranged in parallel has a rectangular parallelepiped appearance. The coil 2 in the form of a rectangular parallelepiped has, as outer peripheral surfaces, some of the outer peripheral surfaces of the both winding portions 21, 22 parallel to the arrangement direction, and one of the outer peripheral surfaces of the winding portion 21 and one of the outer peripheral surfaces of the winding portion 22 located on both sides in the arrangement direction. Any of the two surfaces parallel to the arrangement direction and the one surface of each winding portion 21, 22 is a substantially flat surface. That is, the outer peripheral surfaces of the coil 2 include many flat surfaces. The two surfaces parallel to the arrangement direction are surfaces on front and back sides of the plane of FIG. 1A. The one surface of the winding portion 21 is a lower surface in FIG. 1A. One surface of the winding portion 22 is an upper surface in FIG. 1A.

On the other hand, the inner bottom surface 510 of the case 5 and the inner wall surfaces 521 to 524, which are the inner peripheral surfaces of the case 5, are also substantially flat surfaces (see FIG. 3A). The inner bottom surface 510 and the inner wall surfaces 521 to 524 are described later. Thus, the outer peripheral surfaces of the coil 2 are easily arranged in proximity to the inner bottom surface 510 and the inner wall surfaces 523, 524 of the case 5. See also an interval C5 of FIG. 2 on this point. Further, since the outer peripheral surfaces of the coil 2 include many flat surfaces, the positions of the winding portions 21, 22 in the depth direction of the case 5 are easily adjusted with the assembly 10 accommodated in the case 5. As a result, the arrangement position of the leaf spring fitting 7 to be described later is easily adjusted.

Note that the specification of the coil 2 such as the shapes, the sizes and the like of the winding portions 21, 22 can be changed as appropriate. See a second modification to be described later on this point.

<Magnetic Core>

The magnetic core 3 of this example includes four column-like core pieces (see also FIG. 3A). Two core pieces respectively mainly constitute the inner core portions 31, 32. The remaining two core pieces respectively constitute the outer core portions 33. Since the inner core portions 31, 32 and the outer core portions 33 are independent core pieces, degrees of freedom in selecting constituent materials of the core pieces, the shapes of the core pieces and a manufacturing method are enhanced. Further, in this example, since each inner core portion 31, 32 is constituted by one core piece, the number of the core pieces is small. In this respect, the number of components to be assembled is small and the reactor 1A is excellent in assembling workability.

<<Shapes and Sizes of Core Pieces>>

In this example, the core pieces constituting the respective inner core portions 31, 32 have the same shape and size. Each core piece is in the form of an elongated rectangular parallelepiped having an outer peripheral shape substantially similar to an inner peripheral shape of the winding portions 21, 22. The respective inner core portions 31, 32 are so arranged that axial directions of the respective core pieces are parallel to the axial directions of the respective winding portions 21, 22. Both end parts of the core pieces constituting the inner core portions 31, 32 are exposed from the winding portions 21, 22 since being connected to the outer core portions 33.

In this example, the core pieces constituting the respective outer core portions 33 have the same shape and size and are in the form of rectangular parallelepipeds. Inner end surfaces **3*e* of the outer core portions 33 and end surfaces of the inner core portions 31, 32 are connected (FIG. 3A). Thus, the inner end surface 3*e* has an area larger than the sum of an area of one end surface of the inner core portion 31 and an area of the one end surface of the inner core portion 32. Further, since the outer core portions 33 are in the form of rectangular parallelepipeds, the outer peripheral surfaces of the outer core portions 33 are substantially flat surfaces. Thus, the positions of the outer core portions 33 along the depth direction of the case 5 are easily adjusted with the assembly 10 accommodated in the case 5. As a result, the arrangement position of the leaf spring fitting 7** to be described later is easily adjusted.

Note that the specification of the magnetic core 3 such as the shapes, the sizes and the like of the core pieces can be changed as appropriate. See a third modification to be described later on this point.

<<Constituent Materials >>

Examples of each core piece constituting the magnetic core 3 include compacts mainly containing a soft magnetic material. Examples of the soft magnetic material include metals such as iron and iron alloy and non-metals such as ferrite. The iron alloy is, for example, a Fe—Si alloy, a Fe—Ni alloy or the like. Examples of the compact include compacts of composite materials, powder compacts, laminates of plate materials made of a soft magnetic material such as electromagnetic steel plates, and sintered bodies such as ferrite cores.

A compact of a composite material includes a magnetic powder and a resin. The magnetic powder is dispersed in the resin. The content of the magnetic powder in the composite material is, for example, 30% by volume or more and 80% by volume or less. As the amount of the magnetic powder increases, a saturated magnetic flux density and heat dissipation of the compact of the composite material tend to increase. The content of the resin in the composite material is, for example, 10% by volume or more and 70% by volume or less. The compact of the composite material containing the resin in the above range is excellent in electrical insulation. Thus, an eddy current loss and the like are reduced and the magnetic core 3 tends to have a low loss. Further, the compact of the composite material containing the resin in the above range is unlikely to be magnetically saturated. In the magnetic core 3 including such compacts of the composite material, a magnetic gap is easily omitted or thinned. The resin is, for example, a thermoplastic resin or a thermosetting resin. See the section of the holding members concerning more specific resins.

The powder compact is an aggregate of a magnetic powder. Typically, the powder compact is formed by applying a heat treatment after a mixed powder containing a magnetic powder and a binder is compression-molded into a predetermined shape. The binder is normally denatured or lost by the heat treatment. The powder compact typically has a higher content ratio of the soft magnetic material than the compact of the composite material. For example, a rate of the magnetic powder in the powder compact is 85% by volume or more. In such a powder compact, a saturated magnetic flux density and a relative magnetic permeability are high.

All the core pieces constituting the magnetic core 3 may not be made of the same constituent material or may be made of different materials. Further, the magnetic core 3 may include the core pieces having different constituent materials. In this example, the core pieces mainly constituting the inner core portions 31, 32 are compacts of a composite material. The core pieces constituting the outer core portions 33 are powder compacts. Further, the magnetic core 3 of this example includes no gap material. In this respect, the magnetic core 3 is small in size.

<<Other Members >>

The magnetic core 3 may include an unillustrated magnetic gap if necessary.

The magnetic gap may be an air gap, a plate member made of a non-magnetic material such as alumina or the like.

<Holding Member>

The reactor 1A of this example includes the holding members 4 interposed between the coil 2 and the magnetic core 3. The holding members 4 are typically made of an electrically insulating material and contributes to an improvement in electrically insulation between the coil 2 and the magnetic core 3. The holding members 4 of this example are utilized to support the winding portions 21, 22, the inner core portions 31, 32 and the outer core portion 33 and position the inner core portions 31, 32 and the outer core portions 33 with respect to the winding portions 21, 22.

The holding members 4 of this example are frame-like members provided on the respective end parts of the winding portions 21, 22 of the coil 2. In particular, each holding member 4 includes a frame plate portion 41 provided with a pair of through holes 43 as shown in FIG. 3A and a peripheral wall portion 42 provided along the peripheral edge of the frame plate portion 41. Each holding member 4 has the same basic configuration.

The frame plate portion 41 is interposed between the end surfaces of the winding portions 21, 22 of the coil 2 and the end surface 3*e* of the outer core portion 33. One surface of the frame plate portion 41 is facing the end surfaces of the winding portions 21, 22. The other surface of the frame plate portion 41 is facing the inner end surface 3*e* of the outer core portion 33. End parts of the inner core portions 31, 32 are respectively inserted into the pair of through holes 43 provided in the frame plate portion 41. The frame plate portion 41 includes, on the surface on the side of the winding portions 21, 22, projecting pieces in the form of rectangular parallelepipeds and projecting toward the inner core portions 31, 32 from the inner peripheral edges of the through holes 43. The projecting pieces are not shown. See an inner interposed portion 8 of Patent Document 1 as a member having a similar shape. The projecting pieces are inserted between the inner peripheral surfaces of the winding portions 21, 22 and the outer peripheral surfaces of the inner core portions 31, 32. As a result, clearances corresponding to thicknesses of the projecting pieces are provided between the winding portions 21, 22 and the inner core portions 31, 32. Electrical insulation between the winding portions 21, 22 and the inner core portions 31, 32 is enhanced by these clearances. Further, the winding portions 21, 22 and the inner core portions 31, 32 are positioned by the projecting pieces.

The peripheral wall portion 42 at least partially covers the outer peripheral surfaces of the outer core portion 33 and positions the outer core portion 33 with respect to the holding member 4. Here, the outer peripheral surfaces of the outer core portion 33 are four surfaces connecting the inner end surface 3*e* and an outer end surface 3*o*. The peripheral wall portion 42 of this example is in the form of a gate for covering three continuous surfaces or in the form of a rectangular frame for covering four continuous surfaces, out of the outer peripheral surfaces of the outer core portion 33. The coil 2, the inner core portions 31, 32 and the outer core portion 33 are positioned with each other via such a holding member 4.

In this example, the size of the peripheral wall portion 42 is adjusted to provide clearances between the inner peripheral surfaces of the peripheral wall portion 42 and the outer peripheral surfaces of the outer core portion 33. A constituent resin of the resin molded portion 8 for at least partially covering the outer peripheral surfaces of the outer core portion 33 is filled into these clearances. The holding member 4 is so formed that these clearances, the through holes 43 and clearances between the winding portions 21, 22 and the inner core portions 31, 32 communicate. In a manufacturing process of the reactor 1A, these communication spaces can be utilized as flow passages for a raw material resin for forming the resin molded portion 8. The resin molded portion 8 is described in detail later.

The shape, the size and the like of the holding member 4 can be changed as appropriate if the above functions are provided. Further, a known configuration can be utilized as the holding member 4. For example, the holding member 4 may include a member to be arranged between the winding portions 21, 22 and the inner core portions 31, 32, independently of the frame-like member provided with the frame plate portion 41 and the peripheral wall portion 42 described above. The holding member 4 may be omitted. See the first modification to be described later on this point.

Examples of a constituent material of the holding members 4 include electrically insulating materials such as resins. Specific examples are thermoplastic resins and thermosetting resins. Examples of thermoplastic resins include a polyphenylene sulfide (PPS) resin, a polytetrafluoroethylene (PTFE) resin, a liquid crystal polymer (LCP), a polyamide (PA) resin such as nylon 6 or nylon 66, a polybutylene terephthalate (PBT) resin and an acrylonitrile butadiene styrene (ABS) resin. Examples of thermosetting resins include an unsaturated polyester resin, an epoxy resin, a urethane resin and a silicone resin. The holding members 4 can be manufactured by a known molding method such as injection molding.

<Resin Molded Portions>

The reactor 1A of this example includes the resin molded portions 8 for at least partially covering the magnetic core 3. The resin molded portions 8 have a function of protecting the magnetic core 3 from an external environment, mechanically protecting the magnetic core 3 and enhancing electrical insulation among the magnetic core 3, the coil 2 and surrounding components. As illustrated in FIG. 1A, the resin molded portions 8 cover the magnetic core 3 and are excellent in heat dissipation if the outer peripheral surfaces of the winding portions 21, 22 are exposed without being covered. This is because the outer peripheral surfaces of the winding portions 21, 22 can be proximate to the inner surfaces of the case 5.

The resin molded portion 8 of this example includes an inner resin portion for at least partially covering the inner core portions 31, 32 and an outer resin portion 83 for at least partially covering the outer core portion 33. The inner resin portion is not shown. The resin molded portion 8 of this example is an integrally molded article in which the inner resin portion and the outer resin portion 83 are continuous. Such a resin molded portion 8 can integrally hold the inner core portions 31, 32 and the outer core portion 33. Thus, the rigidity and strength of the magnetic core 3 as an integrated article are enhanced. The resin molded portion 8 in which the inner resin portion and the outer resin portion 83 are continuous can be produced by filling a constituent resin of the resin molded portion 8 into a communication space formed by the clearances between the holding member 4 and the outer core portion 33, the through holes 43 of the holding member 4 and the clearances between the winding portions 21, 22 and the inner core portions 31, 32. The inner resin portion of this example is present at least in parts of the clearances between the winding portions 21, 22 and the inner core portions 31, 32. The outer resin portion 83 covers parts of the outer core portion 33 except the inner end surface 3*e*, i.e. mainly the outer end surface 3*o* and the outer peripheral surfaces, and is present in the above clearances between the holding member 4 and the outer core portion 33.

A covering range, a thickness and the like of the resin molded portion 8 can be selected as appropriate. For example, the resin molded portion 8 may not include the inner resin portion and may substantially cover only the outer core portion 33. This is because the inner core portions 31, 32 can also be integrated via the holding member 4 by integrating the outer core portion 33 and the holding member 4 by the resin molded portion 8 even if the inner resin portion is not provided or even if a formation range of the inner resin portion is small.

Examples of the constituent material of the resin molded portion 8 include various resins. These resins are, for example, thermoplastic resins. Examples of thermoplastic resins include a PPS resin, a PTFE resin, a LCP, a PA resin and a PBT resin. The constituent material may contain a powder excellent in thermal conductivity in addition to the resin. Examples of the powder include powders made of non-metal inorganic materials such as various ceramics and carbon-based materials. Ceramics are, for example, oxides such as alumina, silica and magnesium oxide, nitrides such as silicon nitride, aluminum nitride and boron nitride and carbides such as silicon carbide. Examples of the carbon-based materials include carbon nanotubes. The resin molded portion 8 containing the above powder is more excellent in heat dissipation. Injection molding or the like can be employed to mold the resin molded portion 8.

<Case>

The case 5 has an internal space shaped and dimensioned to be able to accommodate the entire assembly 10, and mechanically protects the assembly 10 and protects the assembly 10 from an external environment. Protection from the external environment aims to improve corrosion resistance and the like. The case 5 of this example is made of metal and also functions as a heat dissipation path for the assembly 10. Generally, metals are more excellent in thermal conductivity than resins. Thus, the case 5 made of metal can be utilized as a heat dissipation path.

The case 5 may be a bottomed tubular body including a bottom portion 51 and a side wall portion 52 standing from the bottom portion 51 and open on a side facing the bottom portion 51. The side facing the bottom portion 51 is an upper side on the plane of FIG. 1A. The bottom portion 51 has the inner bottom surface 510 on which the assembly 10 is placed. In this example, the assembly 10 is placed on the inner bottom surface 510 via the adhesive layer 9 to be described. The side wall portion 52 has inner wall surfaces continuous with the inner bottom surface 510. The inner wall surfaces surround the outer peripheral surfaces of the assembly 10. The opening 55 of the case 5 has a rectangular planar shape.

In this example, the bottom portion 51 is constituted by a rectangular plate material. The side wall portion 52 is constituted by a rectangular parallelepiped tube. The opening 55 has a rectangular planar shape. Thus, the case 5 has a rectangular parallelepiped internal space and a rectangular parallelepiped appearance. The inner surfaces of the case 5 include four inner wall surfaces 521 to 524 constituting the inner peripheral surfaces and the inner bottom surface 510. The inner wall surfaces 521, 522 are located on both sides in the long side direction of the opening 55 and facing each other. The inner wall surfaces 523, 524 are located on both sides in a short side direction of the opening 55 and facing each other. The short side direction is along a vertical direction on the plane of FIG. 2. The inner bottom surface 510 has substantially the same rectangular planar shape as the opening 55. Note that a part of the side wall portion 52 including the inner wall surface 524 is cut and not shown in FIG. 1A.

Any of the inner wall surfaces 521 to 524 and the inner bottom surface 510 of this example is substantially a flat surface. With the assembly 10 accommodated in the case 5, the surfaces parallel to the arrangement direction, out of the peripheral surfaces of the coil 2, are arranged to face the inner wall surfaces 523, 524. Further, out of the outer peripheral surfaces of the coil 2, the one surface, i.e. the lower surface in FIG. 1A, of the one winding portion 21, is arranged to face and be parallel to the inner bottom surface 510. That is, the outer peripheral surfaces of the coil 2 and the inner wall surfaces 521 to 524 and the inner bottom surface 510 of the case 5 are flat surfaces facing each other. In parts where the flat surfaces are facing each other, intervals between the outer peripheral surfaces of the coil 2 and the inner surfaces of the case 5 tend to be small. Further, in parts where the outer peripheral surfaces of the coil 2 and the inner surfaces of the case 5 are substantially parallel, the intervals between the outer peripheral surfaces of the coil 2 and the inner surfaces of the case 5 are substantially uniform.

In the reactor 1A of the first embodiment, distances between the outer peripheral surfaces of the coil 2 and the inner surfaces of the case 5 are very short.

For example, an interval C8 between the one surface, i.e. the lower surface in FIG. 1A, of the winding portion 21 and the inner bottom surface 510 of the case 5 is about a thickness of the adhesive layer 9 to be described later. For example, the interval C8 is 0.5 mm or less and further 0.3 mm or less.

Intervals C5 between the surfaces parallel to the arrangement direction, i.e. the upper and lower surfaces in FIG. 2, out of the outer peripheral surfaces of the winding portion 22, and the respective inner wall surfaces 523, 524 are, for example, about 0.3 mm or more and 0.5 mm or less. If the intervals C5 are 0.3 mm or more, the raw material resin 60 (FIG. 3D) of the sealing resin portion 6 is easily filled into the clearances between the winding portion 22 and the inner peripheral surfaces of the case 5 in the manufacturing process of the reactor 1A. If the intervals C5 are 0.5 mm or less, the heat of the winding portions 21, 22 is easily transferred to the case 5 and the reactor 1A is excellent in heat dissipation. Further, the installation area tends to be small and the reactor 1A is easily reduced in size.

The case 5 of this example is a box made of metal and integrally molded with the bottom portion 51 and the side wall portion 52. Thus, the case 5 can be satisfactorily utilized as a continuous heat dissipation path. Particularly, if the constituent material of the case 5 is an aluminum-based material such as pure aluminum or aluminum-based alloy, the case 5 has a high thermal conductivity and is excellent in heat dissipation and, in addition, light in weight. Further, in this case, since the aluminum-based material is a non-magnetic material, the case 5 is unlikely to magnetically affect the coil 2. Particularly, pure aluminum is higher in thermal conductivity than aluminum-based alloy. Thus, the case 5 made of pure aluminum is more excellent in thermal conductivity. Further, pure aluminum is softer than iron-based materials such as chrome steel. Thus, the end parts 71, 72 of the leaf spring fitting 7 easily bite into the inner wall surfaces 521, 522 of the case 5 in the manufacturing process of the reactor 1A. This is described in detail later. The case 5 of this example is made of an aluminum-based material.

A volume, as a specific size, of the case 5 is, for example, 250 $cm^3$ or more and 1450 $cm^3$ or less. A length of long sides of the opening 55 is, for example, 80 mm or more and 120 mm or less. A length of short sides of the opening 55 is, for example, 40 mm or more and 80 mm or less. A depth of the case 5 is, for example, 80 mm or more and 150 mm or less.

<Leaf Spring Fitting>

The leaf spring fitting 7 is a member for pressing the assembly 10 accommodated in the case 5 toward the inner bottom surface 510 of the case 5. Particularly, in the reactor 1A of the first embodiment, the leaf spring fitting 7 is arranged between facing parts of the inner wall surfaces of the case 5 and arranged in a curved state by being directly pressed against the facing parts. Here, the leaf spring fitting 7 is arranged between the inner wall surfaces 521 and 522. The leaf spring fitting 7 exhibits a biasing force for pressing the assembly 10 by being supported in a curved state convex toward the inner bottom surface 510 by the case 5. A pressing part of the leaf spring fitting 7 for pressing the assembly 10 includes lowermost points in the depth direction of the case 5 in the curved part of the leaf spring fitting 7. Further, in the reactor 1A of the first embodiment, parts of the case 5 pressing the leaf spring fitting 7 are parts facing each other in the long side direction of the rectangular opening 55, here, the inner wall surfaces 521, 522.

As shown in FIG. 2, the leaf spring fitting 7 of this example is a strip plate having a uniform width W7. The leaf spring fitting 7 includes a body portion 70 and the end parts 71, 72. The body portion 70 includes the pressing part for pressing the assembly 10. The end parts 71, 72 are supported on the case 5.

The body portion 70 of this example has a uniform thickness as shown in FIG. 1A. Further, the body portion 70 of this example includes U-shaped projections 73 locally projecting in a thickness direction of the strip plate. In particular, regions of the body portion 70 on the sides of the end parts 71, 72 are respectively bent into a U shape to intersect a longitudinal direction of the strip plate. With the leaf spring fitting 7 accommodated in the case 5, the projections 73 are arranged to project toward the inner bottom surface 510 and form lowermost points in the depth direction of the case 5 in the leaf spring fitting 7. The leaf spring fitting 7 of this example includes the projections 73 as the pressing part for pressing the assembly 10. In this example, the respective projections 73 are formed at such positions as to be directly or indirectly in contact with the respective outer core portions 33 with the leaf spring fitting 7 supported in a curved state in the case 5.

Here, in the leaf spring fitting 7 accommodated and curved in the case 5, the lowermost points in the depth direction of the case 5 are points most distant from a shortest straight line connecting the both end parts 71, 72 of the leaf spring fitting 7. The lowermost points of the leaf spring fitting 7 are points where the biasing force of the leaf spring fitting 7 is exhibited most. Thus, the lowermost points and parts near the lowermost points of the leaf spring fitting 7 are suitable as the pressing part for the assembly 10. Accordingly, the shape, the size and the like of the leaf spring fitting 7 are preferably so adjusted that the lowermost points and the parts near the lowermost points are included in the pressing part for the assembly 10. In the case of including the projections 73, the projections 73 form the lowermost points and the parts near the lowermost points. Note that the projections 73 can be omitted. See a second embodiment to be described later on this point.

In this example, a length of the leaf spring fitting 7, projecting lengths and formation positions of the projections 73 and the like are so adjusted that the tips of the respective projections 73 press the outer core portions 33 with the leaf spring fitting 7 supported in the curved state by the case 5. Thus, the leaf spring fitting 7 does not contact the coil 2. Such a reactor 1A is excellent in electrical insulation between the coil 2 and the leaf spring fitting 7. The leaf spring fitting 7 of this example indirectly presses the outer core portions 33 via the peripheral wall portions 42 surrounding the outer core portions 33. In particular, the leaf spring fitting 7 presses one surface of each peripheral wall portion 42 covering one surface arranged on the side of the opening 55 of the case 5, out of the outer peripheral surfaces of the outer core portion 33 (FIG. 1A). The holding members 4 may be omitted and the leaf spring fitting 7 may directly press the outer core portions 33. See the first modification to be described later on this point.

The both end parts 71, 72 of this example include parts thinner than the body portion 70. In particular, each of the both end parts 71, 72 has an inclined surface 77. The inclined surface 77 is inclined to thin the leaf spring fitting 7 from one surface side toward the other surface side of the strip plate. The leaf spring fitting 7 having the inclined surfaces 77 is constituted by a strip plate in which a length of one surface is longer than that of the other surface. Since the both surfaces except the inclined surfaces 77 have different lengths, the leaf spring fitting 7 tends to be so curved that the longer one surface is concave and the shorter other surface is convex. Thus, if the leaf spring fitting 7 is so accommodated into the case 5 that the longer one surface is located on the side of the opening 55 of the case 5 and the shorter other surface is located on the side of the inner bottom surface 510 of the case 5, the leaf spring fitting 7 easily maintains a state curved to be convex toward the inner bottom surface 510. As a result, the leaf spring fitting 7 satisfactorily presses the assembly 10 toward the inner bottom surface 510. Note that, with the leaf spring fitting 7 accommodated in the case 5, the inclined surfaces 77 of the both end parts 71, 72 are respectively inclined to thin the leaf spring fitting 7 from the side of the inner bottom surface 510 toward the side of the opening 55 of the case 5.

By providing the inclined surfaces 77 on the both end parts 71, 72, the tips of the leaf spring fittings 7 are pointed. Thus, the tips of the leaf spring fitting 7 can bite into the inner wall surfaces 521, 522 of the case 5 as shown in FIGS. 1A and 1B, although also depending on the constituent materials of the leaf spring fitting 7 and the case 5. By this biting or piercing, the leaf spring fitting 7 is unlikely to be shifted in position and easily maintains a state supported on the both inner wall surfaces 521, 522 even if vibration or the like occurs when the reactor 1A is used. Further, the leaf spring fitting 7 is unlikely to be detached from the case 5. Thus, the leaf spring fitting 7 can satisfactorily press the assembly 10 toward the inner bottom surface 510 of the case 5 over a long period of time. By causing the tips of the leaf spring fitting 7 to bite or pierce into the inner wall surfaces 521, 522 of the case 5 in the manufacturing process of the reactor 1A, such a biting state of the leaf spring fitting 7 can be achieved. Note that the inclined surfaces 77 can be omitted. See the second embodiment to be described later on this point.

A length, a width W7, a thickness and the like of the leaf spring fitting 7 can be selected as appropriate in a range in which a biasing force capable of pressing the assembly 10 toward the inner bottom surface 510 of the case 5 can be exhibited.

Typically, the length of the leaf spring fitting 7 is longer than that of the long sides of the opening 55 of the case 5. Here, a shortest length along one or the other surface of the leaf spring fitting 7 is called an actual length. Further, a shortest distance from one end part 71 to the other end part 72 of the leaf spring fitting 7 is called an apparent length. For example, if the leaf spring fitting 7 is a compact plastically deformed into an arc shape, the actual length is equivalent to a length of an arc and the apparent length is equivalent to a length of a chord. If the apparent length of the leaf spring fitting 7 is equal to or longer than a distance between the inner wall surfaces 521 and 522 of the case 5 for supporting the end parts 71, 72, i.e. a long side length L5 of the opening 55 of the case 5 at a room temperature $T_r$, e.g. at 20° C.±15° C. in Japan, the actual length is longer than the long side length L5. Thus, the leaf spring fitting 7 reliably has a curved part and can exhibit the biasing force for pressing the assembly 10 in the state supported in the case 5. The leaf spring fitting 7 having the tips of the both end parts 71, 72 configured to bite into the both inner wall surfaces 521, 522 as in this example include biting parts into the inner wall surfaces 521, 522. The apparent length of such a leaf spring fitting 7 is longer than the long side length L5. Further, in the leaf spring fitting 7 including the projections 73 as in this example, the actual length is easily made longer than the long side length L5.

As the width W7 of the leaf spring fitting 7 increases, the leaf spring fitting 7 more reliably presses the assembly 10. The width W7 is smaller than a width W5 of the opening 55 of the case 5 and 50% or more and less than 100%, further 60% or more and 80% or less of a width W1 of the assembly 10. Since the width W7 of the leaf spring fitting 7 is less than the width W5 of the case 5, the leaf spring fitting 7 is easily accommodated through the opening 55 of the case 5 in the manufacturing process. Further, since the width W7 of the leaf spring fitting 7 is smaller than the width W1 of the assembly 10, the leaf spring fitting 7 does not become excessively large and the case 5 easily properly supports the leaf spring fitting 7. The thickness of the leaf spring fitting 7 is, for example, about 0.5 mm or more and 1.0 mm or less.

The constituent material of the leaf spring fitting 7 is preferably a metal excellent in springiness. Examples of the metal excellent in springiness include iron-based alloys, particularly various steels. Examples of the steels include chrome steels and stainless steels. The stainless steel is, for example, SUS 304 or the like. Further, the constituent material of the leaf spring fitting 7 may be a metal having a smaller linear expansion coefficient than the constituent material of the case 5 and less likely to thermally shrink than the case 5. In this case, a manufacturing method (i) to be described later can be suitably utilized. Further, if the constituent material of the leaf spring fitting 7 is harder than that of the case 5, it is preferable since the end parts 71, 72 easily bite into the case 5 when the inclined surfaces 77 are provided. The leaf spring fitting 7 of this example is constituted by a strip plate made of chrome steel. Thus, the leaf spring fitting 7 of this example is harder than the case 5 made of the aluminum-based material.

The shape, the size, the constituent material, the number and the like of the leaf spring fitting 7 can be selected as appropriate. The size of the leaf spring fitting 7 may include the actual length, the width W7, the thickness, angles of the inclined surfaces 77 and the like.

For example, one projection 73 may be provided. The width W7 of the leaf spring fitting 7 may be, for example, locally widened or narrowed. A plurality of the leaf spring fittings 7 may be, for example, arranged side by side in the short side direction of the opening 55 of the case 5.

However, if the width W7 is 60% or more and 80% or less of the width W1, i.e. large to a certain extent and one leaf spring fitting 7 is provided as in this example, the number of components to be assembled is small. In this respect, the reactor 1A is excellent in assembling workability.

<Sealing Resin Portion>

The sealing resin portion 6 is filled into the case 5. Further, the sealing resin portion 6 covers the assembly 10. More specifically, the sealing resin portion 6 is interposed in clearances between the assembly 10 and the case 5. Further, the sealing resin portion 6 covers a region of the assembly 10 on the side of the opening 55. Such a sealing resin portion 6 performs various functions such as mechanical protection of the assembly 10, protection of the assembly 10 from an external environment, an improvement in electrical insulation between the assembly 10 and the case 5 and an improvement in the strength and rigidity of the reactor 1A by the integration of the assembly 10 and the case 5. An improvement in heat dissipation can also be expected, depending on a material of the sealing resin portion 6. Note that protection from the external environment is aimed to improve corrosion resistance and the like.

The sealing resin portion 6 of this example embeds the entire assembly 10 and the entire leaf spring fitting 7. Thus, the sealing resin portion 6 is expected to also perform a function of maintaining a state where the both end parts 71, 72 of the leaf spring fitting 7 are directly pressed against the inner wall surfaces 521, 522 of the case 5, i.e. a state where the leaf spring fitting 7 is curved. By maintaining the state where the leaf spring fitting 7 is curved over a long period of time, the leaf spring fitting 7 continues to exhibit the biasing force for pressing the assembly 10 toward the inner bottom surface 510. Thus, even if such as stress as to remove the sealing resin portion 6 from the case 5 acts on the sealing resin portion 6 and the assembly 10 is going to be detached from the case 5 together with the sealing resin portion 6, the leaf spring fitting 7 can effectively prevent this detachment.

An embedding range of the sealing resin portion 6 can be changed as appropriate. For example, at least a part of the leaf spring fitting 7 or a part of the assembly 10 may be exposed from the sealing resin portion 6.

Examples of the constituent material of the sealing resin portion 6 include various resins, e.g. thermosetting resins. Examples of the thermosetting resins include an epoxy resin, a urethan resin, a silicone resin and an unsaturated polyester resin. Besides, the constituent material may be a thermoplastic resin such as a PPS resin. The constituent material may contain a powder excellent in thermal conductivity or a powder excellent in electrical insulation in addition to the resin. Examples of the powder include powders made of non-metal inorganic materials including ceramics such as alumina described above. The sealing resin portion 6 containing the above powder is more excellent in heat dissipation and electrical insulation. Besides, a known resin composition can be utilized for the sealing resin portion 6. The constituent material of the sealing resin portion 6 of this example contains a powder of alumina or the like and is excellent in heat dissipation.

<Adhesive Layer>

The reactor 1A of this example includes the adhesive layer 9. The adhesive layer 9 is interposed between the assembly 10 and the inner bottom surface 510 of the case 5. The adhesive layer 9 of this example joins one surface of the one winding portion 21 and one surface of each holding member 4 in the assembly 10 to the inner bottom surface 510 as shown in FIG. 1A. The one surface of the winding portion 21 and the one surface of each holding member 4 are both lower surfaces in FIG. 1A.

The adhesive layer 9 firmly bonds the assembly 10 and the inner bottom surface 510. Thus, even if vibration, a thermal shock or the like occurs when the reactor 1A is used, the assembly 10 is hardly detached from the case 5. Accordingly, the adhesive layer 9 contributes to preventing the detachment of the assembly 10 from the case 5. The thermal shock possibly occurs due to a temperature difference associated with a temperature difference in a use environment of the reactor 1A or energization and de-energization. Further, by being bonded by the adhesive layer 9, the assembly 10 can maintain a state proximate to the inner bottom surface 510. Thus, the heat of the assembly 10, particularly the heat of the coil 2 in this example, is easily transferred to the bottom portion 51 of the case 5. Therefore, the adhesive layer 9 also contributes to an improvement in heat dissipation.

A constituent material, a formation region, a thickness and the like of the adhesive layer 9 can be selected as appropriate. Examples of the constituent material of the adhesive layer 9 typically include electrically insulating materials such as resins. The adhesive layer 9 containing a resin and the like easily enhances electrical insulation between a placed region of the assembly 10 on the case 5 and the inner bottom surface 510 of the case 5. The constituent material may contain a powder excellent in thermal conductivity in addition to the resin. The thermal conductivity of the constituent material is, for example, 0.1 W/m·k or more, further 1 W/m·k or more or 2 W/m·k or more. The adhesive layer 9 having a thermal conductivity of 0.1 W/m·k or more easily transfers the heat of the assembly 10 to the inner bottom surface 510 of the case 5. The reactor 1A including such an adhesive layer 9 is excellent in heat dissipation.

A commercially available adhesive sheet or adhesive can be utilized as the adhesive layer 9. For example, the adhesive may be applied to the assembly 10 or the inner bottom surface 510 to form a coating layer. The formation region of the adhesive layer 9 may be selected according to a bonding area.

As the adhesive layer 9 becomes thinner, the interval between the one surface of the winding portion 21 of the assembly 10 and the inner bottom surface 510 of the case becomes smaller. As a result, the heat of the coil 2 is easily transferred to the case 5, particularly to the bottom portion 51. Thus, the reactor 1A is excellent in heat dissipation. If an improvement in heat dissipation is desired, the thickness of the adhesive layer 9 is, for example, preferably 0.3 mm or more and 1 mm or less, preferably 0.5 mm or less. If the adhesive layer 9 is 0.3 mm or more, the assembly 10 and the inner bottom surface 510 can be satisfactorily joined and, in addition, electrical insulation described above is easily enhanced.

(Manufacturing Method of Reactor)

The following methods (i), (ii) and the like can be, for example, utilized as the manufacturing method of the reactor 1A of the first embodiment. The method (i) is a method for pressing the leaf spring fitting 7 utilizing the thermal expansion and shrinkage of the case 5. The method (ii) is a method for physically fitting the leaf spring fitting 7 longer than the long side length L5 of the opening 55 of the case 5.

<<Method (i): Shrink-Fit Method>>

Specific steps (i-1) to (i-5) of the method (i) are described below.

(i-1) Accommodate the assembly 10 into the case 5 (FIG. 3A).

Figure 3B:
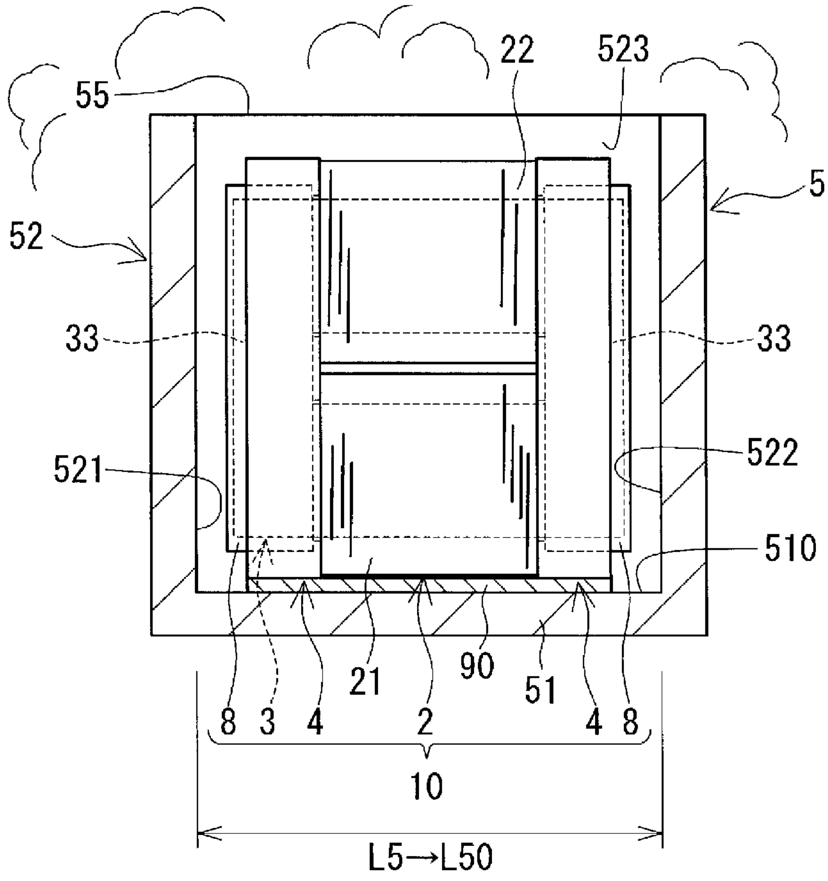
FIG. 3B is a process diagram showing a step of heating the case accommodating the assembly in the process for manufacturing the reactor of the first embodiment.

(i-2) Heat the case 5 accommodating the assembly 10 at a predetermined temperature $T_5$ higher than the room temperature $T_r$ (FIG. 3B).

Figure 3C:
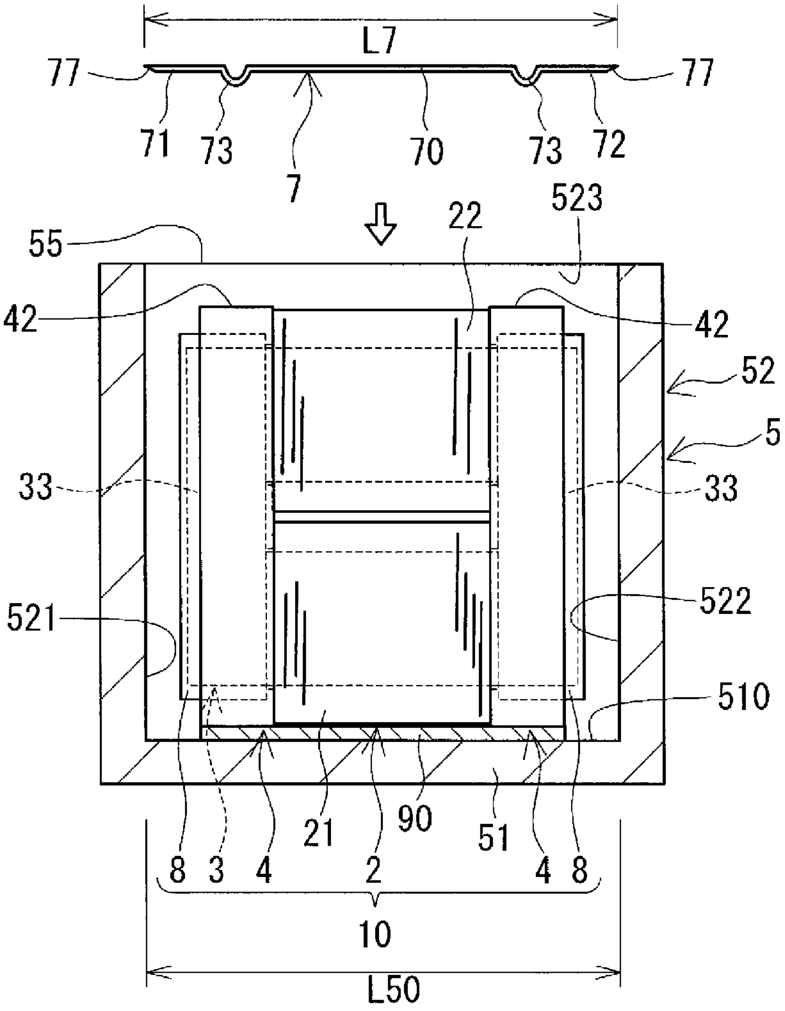
FIG. 3C is a process diagram showing a step of arranging a leaf spring fitting in the case having a predetermined temperature in the process for manufacturing the reactor of the first embodiment.

(i-3) Arrange the leaf spring fitting 7 having a predetermined temperature $T_7$ equal to or lower than the room temperature $T_r$ in the case 5 having the temperature $T_5$ (FIG. 3C).

The apparent length L7 of the leaf spring fitting 7 at the temperature $T_7$ is equal to or shorter than a long side length L50 of the opening 55 of the case 5 at the temperature $T_5$. The apparent length L7 is a shortest distance from the one end part 71 to the other end part 72 of the leaf spring fitting 7. However, it is assumed that the apparent length of the leaf spring fitting 7 at the room temperature $T_r$ is longer than the long side length L5 of the opening 55 at the room temperature $T_r$.

Figure 3D:
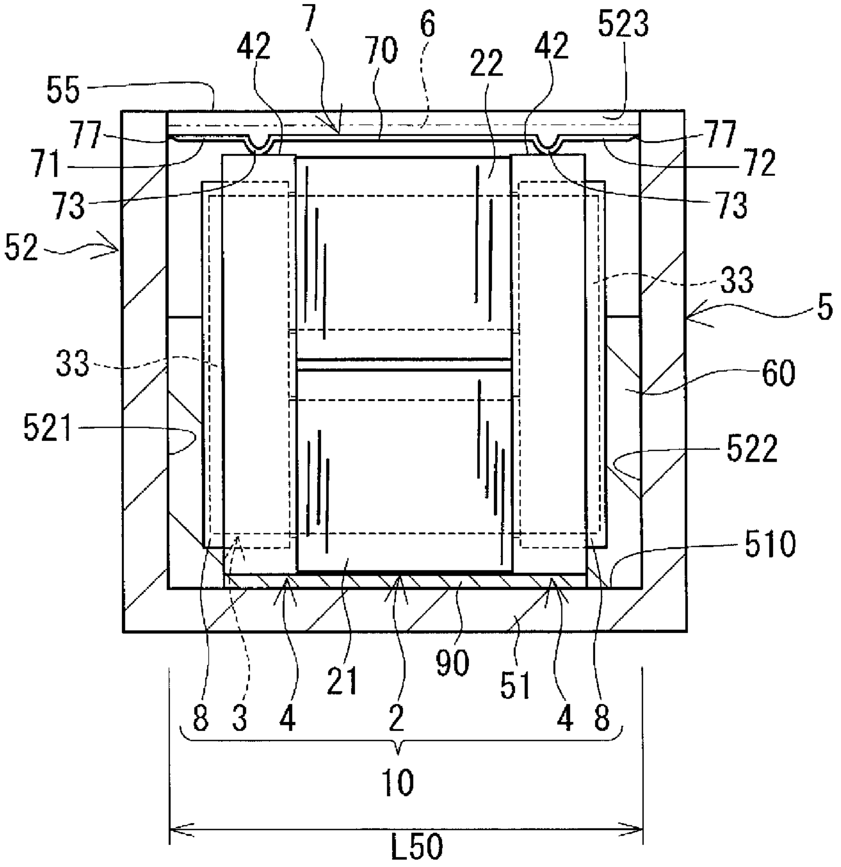
FIG. 3D is a process diagram showing a state while a raw material resin of a sealing resin portion is being filled into the case in the process for manufacturing the reactor of the first embodiment.

(i-4) Fill the raw material resin 60 of the sealing resin portion 6 into the case 5 having the leaf spring fitting 7 arranged therein (FIG. 3D).

(i-5) Form the sealing resin portion 6 by heating and curing the raw material resin 60 at a predetermined temperature T6 after the filling of the raw material resin 60 (FIG. 1A).

Each step is described below.

In Step (i-1), the assembly 10 and the case 5 are prepared and the assembly 10 is accommodated into the case 5. This Step (i-1) is typically performed at the room temperature $T_r$. In this example, by forming the resin molded portions 8 after the coil 2, the magnetic core 3 and the holding members 4 are assembled, the assembly 10 is manufactured. The assembly 10 is easily handled and can be easily accommodated into the case 5 since being integrated by the resin molded portions 8. Further, in this example, an adhesive sheet 90 serving as the adhesive layer 9 may be arranged on the inner bottom surface 510 of the case 5 or an adhesive may be applied. Note that the resin molded portions 8 are not shown in FIG. 3A. Further, FIGS. 3A to 3D illustrate the adhesive sheet 90.

In this example, the assembly 10 is so accommodated into the case 5 that the arrangement direction of the winding portions 21, 22 is along the depth direction of the case 5. By this accommodation, the reactor 1A of the vertically stacked type can be manufactured.

In Step (i-2), the case 5 accommodating the assembly 10 is heated. This heating is equivalent to pre-heating performed so that the raw material resin 60 of the sealing resin portion 6 is easily cured. Thus, the temperature $T_5$ may be selected according to the constituent material of the sealing resin portion 6. However, $T_r<T_5$. By heating from the room temperature $T_r$ to the temperature $T_5$, the case 5 thermally expands. By this thermal expansion, the long side length of the opening 55 of the case 5 at the temperature $T_5$ changes from the length L5 at the room temperature $T_r$ to the length L50. L5<L50. A change amount of the long side length associated with the thermal expansion of the case 5 is typically adjusted by a thermal expansion coefficient of the constituent material of the case 5, a volume of the case 5 and a temperature difference between the room temperature $T_r$ and the temperature $T_5$.

In Step (i-3), the leaf spring fitting 7 having the relatively low temperature $T_7$ is accommodated into the case 5 having the high temperature $T_5$. $T_7$ $T_r<T_5$. Here, the leaf spring fitting 7 is so accommodated into the case 5 that a longitudinal direction of the leaf spring fitting 7 is along the long side direction of the opening 55 of the case 5.

Particularly, the apparent length L7 of the leaf spring fitting 7 at the temperature $T_7$ is equal to or shorter than the long side length L50 of the opening 55 of the thermally expanded case 5. If the apparent length L7 at the temperature $T_7$ is substantially equal to the long side length L5 at the temperature $T_5$, i.e. if L7=L50, the leaf spring fitting 7 can be arranged to be placed on the assembly 10 in the case 5. If the apparent length L7 at the temperature $T_7$ is shorter than the long side length L50 at the temperature $T_5$, i.e. if L7<L50, the leaf spring fitting 7 can be easily arranged in the case 5.

Since the leaf spring fitting 7 is at the temperature $T_7$ equal to or lower than the room temperature $T_r$, the apparent length L7 of the leaf spring fitting 7 at the temperature $T_7$ is equal to the apparent length at the room temperature $T_r$ or shorter than the apparent length at the room temperature $T_r$ due to thermal shrinkage. Accordingly, the apparent length L7 and the long side length L50 of the opening 55 are so adjusted that the apparent length of the leaf spring fitting 7 at the room temperature $T_r$ is longer than the long side length L5 of the opening 55 at the room temperature $T_r$. By this adjustment, the leaf spring fitting 7 is reliably pressed against the inner wall surfaces 521, 522 if the case 5 thermally shrinks in a cooling process of the raw material resin 60 as described later. Particularly, parts of the case 5 holding the leaf spring fitting 7 are not the inner wall surfaces 523, 524 facing in the short side direction of the opening 55, but the inner wall surfaces 521, 522 facing in the long side direction. Thus, the amount of thermal shrinkage of the case 5 tends to be large. Therefore, the leaf spring fitting 7 can be satisfactorily pressed, utilizing the thermal shrinkage of the case 5.

The leaf spring fitting 7 of this example has the inclined surfaces 77 on the end parts 71, 72. Thus, the leaf spring fitting 7 is so accommodated into the case 5 that the shorter one surface, out of the front and back surfaces of the leaf spring fitting 7, faces the inner bottom surface 510 of the case 5. Further, the leaf spring fitting 7 of this example includes the U-shaped projections 73. Thus, the leaf spring fitting 7 is so accommodated into the case 5 that the tips of the projections 73 face the inner bottom surface 510 of the case 5. By this accommodation, if the case 5 thermally shrinks, the leaf spring fitting 7 is easily curved to be convex toward the inner bottom surface 510 and can press the assembly 10 by the projections 73.

Note that FIG. 3C illustrates a strip plate extending straight except at the projections 73 as the leaf spring fitting 7 before being accommodated into the case 5. The tips of the projections 73 of this leaf spring fitting 7 are easily placed on the one surface of each outer core portion 33. The one surface of the outer core portion 33 is an upper surface in FIG. 3C, here, one surface of the peripheral wall portion 42 of the holding member 4 covering this upper surface. Besides, the leaf spring fitting 7 may be arcuately curved before being accommodated into the case 5. That is, a strip plate curved by plastic deformation can be utilized as the leaf spring fitting 7 before being accommodated into the case 5. Also in the leaf spring fitting 7 curved in advance, the apparent length L7 at the temperature $T_7$ is equal to or shorter than the long side length L50 at the temperature $T_5$. The leaf spring fitting 7 curved in advance is not shown.

As another example of Step (i-3), the apparent length L7 at the temperature $T_7$ may be longer than the long side length L50 of the opening 55 of the case at the temperature $T_5$. In this case, the leaf spring fitting 7 can be arranged on the assembly 10 by being pushed in. The leaf spring fitting 7 may be so pushed in that the side facing the inner bottom surface 510 of the case 5 is convex. If the inclined surfaces 77 are provided on the end parts 71, 72 of the leaf spring fitting 7 and the constituent material of the case 5 is a metal softer than the leaf spring fitting 7 as in this example, the tips of the respective end parts 71, 72 bite into the inner wall surfaces 521, 522 of the case 5 when the leaf spring fitting 7 is pushed in. A combination of such a leaf spring fitting 7 and the case 5 is, for example, a combination of the leaf spring fitting 7 made of chrome steel and the case 5 made of pure aluminum. If the apparent length L7 at the temperature $T_7$ is longer than the long side length L50 at the temperature $T_5$, the leaf spring fitting 7 is more reliably curved.

In Step (i-4), the raw material resin 60 is filled into the case 5 with the temperature of the case 5 kept at the temperature $T_5$. The raw material resin 60 is a fluid resin and constitutes the sealing resin portion 6 by being cured. FIG. 3D illustrates a state where the raw material resin 60 is being filled and the liquid surface of the raw material resin 60 is at an intermediate position in the depth direction of the case 5.

In Step (i-4), the long side length L50 of the case 5 does not substantially change by keeping the temperature of the case 5 at the temperature $T_5$. That is, the case 5 is kept in a thermally expansion state at the temperature $T_5$. On the other hand, the leaf spring fitting 7 can thermally expand by being gradually heated to increase the temperature due to heat transfer from the assembly 10 and the case 5. If the inclined surfaces 77 are provided on the end parts 71, 72 of the leaf spring fitting 7 and the constituent material of the case 5 is the metal softer than the leaf spring fitting 7 as described above, the tips of the leaf spring fitting 7 including the inclined surfaces 77 automatically bite into the inner wall surfaces 521, 522 of the case 5 by this thermal expansion. Thus, the thermal expansion of the leaf spring fitting 7 is allowed. If the thermal expansion coefficient of the constituent material of the leaf spring fitting 7 is smaller than that of the constituent material of the case 5, the amount of thermal expansion of the leaf spring fitting 7 is small. Thus, the thermal expansion of the leaf spring fitting 7 may be substantially ignored.

In Step (i-5), the raw material resin 60 is cured by being heated at the predetermined temperature T6, i.e. a curing temperature, and kept at this temperature for a predetermined time after the filling of the raw material resin 60. The sealing resin portion 6 is formed by being cooled to the room temperature $T_r$ after the elapse of the predetermined time. In the cooling process to the room temperature $T_r$, the case 5 thermally shrinks. By this thermal shrinkage, the long side length of the case 5 changes from the length L50 at the temperature $T_5$ to the length L5 at the room temperature $T_r$. Associated with the above thermal shrinkage, the facing inner wall surfaces 521, 522 are displaced toward each other. On the other hand, the apparent length of the leaf spring fitting 7 at the temperature $T_5$ is longer than the long side length L5 of the case 5 at the room temperature $T_r$. Thus, in this cooling process, the both end parts 71, 72 of the leaf spring fitting 7 arranged between the inner wall surfaces 521 and 522 are pressed against the both inner wall surfaces 521, 522. The leaf spring fitting 7 is curved by the pressing of the both inner wall surfaces 521, 522.

The leaf spring fitting 7 of this example has the inclined surfaces 77 on the end parts 71, 72. Thus, the tips of the respective end parts 71, 72 automatically bite into the respective inner wall surfaces 521, 522 by the both inner wall surfaces 521, 522 being displaced toward each other. By this biting, the leaf spring fitting 7 is directly supported in the case 5. Further, by having the inclined surfaces 77, the leaf spring fitting 7 is easily curved to be convex on the side facing the inner bottom surface 510 of the case 5.

The raw material resin 60 is cured while the leaf spring fitting 7 is curved. The cured sealing resin portion 6 contributes to maintaining the curved state of the leaf spring fitting 7 by the both end parts 71, 72 being directly pressed against the inner wall surfaces 521, 522 of the case 5.

The temperature of the case 5 may rise due to the heat generation of the coil 2 when the reactor 1A is used. However, the reactor 1A can suppress the thermal expansion of the case 5 by the sealing resin portion 6. Thus, the leaf spring fitting 7 can maintain the state biting into the inner wall surfaces 521, 522 of the case 5 also when the reactor 1A is used. Accordingly, the leaf spring fitting 7 can maintain the curved state by the above biting over a long period of time without being shifted in position with respect to the case 5 or detached from the case 5 even if vibration or the like occurs when the reactor 1A is used. That is, the leaf spring fitting 7 can satisfactorily maintain the state where the assembly 10 is pressed toward the inner bottom surface 510 of the case 5 over a long period of time.

<<Method (ii): Push-In Method>>>

Specific steps (ii-1), (ii-2) of the method (ii) are described below.

(ii-1) Accommodate the assembly 10 and the leaf spring fitting 7 into the case 5.

It is assumed that the apparent length of the leaf spring fitting 7 at the room temperature $T_r$ is longer than the long side length L5 of the opening 55 of the case 5 at the room temperature $T_r$ and the apparent length is a shortest distance from the one end part 71 to the other end part 72 of the leaf spring fitting 7.

(ii-2) Fill and cure the raw material resin 60 of the sealing resin portion 6 into the case 5 having the leaf spring fitting 7 arranged therein to form the sealing resin portion 6 (FIG. 1A).

The method (ii) is a method in which the leaf spring fitting 7 sufficiently longer than the long side length of the opening 55 of the case 5 at an arbitrary temperature is prepared and pushed into the case 5. As described in the method (i), the case 5 thermally expands by being heated from the room temperature $T_r$ to the temperature T6 for curing the sealing resin portion 6 in the manufacturing process of the reactor 1A. However, if the apparent length at the room temperature $T_r$ is longer than the long side length L5 at the room temperature $T_r$, the leaf spring fitting 7 is finally supported in the curved state by the case 5 even if the case 5 thermally shrinks in the manufacturing process of the reactor 1A.

Step (ii-1) is typically performed at the room temperature $T_r$. First, the assembly 10 is accommodated into the case 5. In this example, the assembly 10 is so accommodated into the case 5 that the arrangement direction of the winding portions 21, 22 is along the depth direction of the case 5.

Subsequently, the leaf spring fitting 7 is accommodated into the case 5. In particular, the leaf spring fitting 7 is so pushed in that the respective end parts 71, 72 come into contact with the inner wall surfaces 521, 522 facing in the long side direction in the opening 55 of the case 5. Particularly, the leaf spring fitting 7 is pushed in to be curved and convex on the side facing the inner bottom surface 510 of the case 5.

The leaf spring fitting 7 of this example has the inclined surfaces 77 on the end parts 71, 72. Thus, when being pushed in, the leaf spring fitting 7 is trying to restore from a curved state to a straight state and presses the inner wall surfaces 521, 522 with the end parts 71, 72. By this pressing, the tips of the respective end parts 71, 72 bite into the inner wall surfaces 521, 522 of the case 5 as described above. By this biting, the leaf spring fitting 7 is directly supported in the case 5. Further, by having the inclined surfaces 77, the leaf spring fitting 7 is easily curved to be convex on the side facing the inner bottom surface 510 of the case 5. Thus, the leaf spring fitting 7 is easily pushed in to be curved and convex on the side facing the inner bottom surface 510 of the case 5.

In Step (ii-2), the raw material resin 60 is filled into the case 5 including the leaf spring fitting 7 supported in the curved state by the case 5 and cured to form the sealing resin portion 6. The cured sealing resin portion 6 contributes to maintaining the curved state of the leaf spring fitting 7 by the both end parts 71, 72 being directly pressed against the inner wall surfaces 521, 522 of the case 5.

Effects

The reactor 1A of the first embodiment is small in size and excellent in heat dissipation for the following reasons.

<Small Size>

(a) The case 5 does not include mounting bases to which the leaf spring fitting 7 are bolted. Thus, the intervals between the outer peripheral surfaces of the assembly 10 and the inner surfaces of the case 5 can be reduced in the reactor 1A as compared to a reactor including a case provided with the mounting bases. As a result, the long side length L5 of the case 5 and the width W5, which is a short side length, can be reduced.

(b) Since the reactor 1A is of the vertically stacked type, it may be possible to reduce an installation area as compared to a reactor of the horizontally placed type. Specifically, it is assumed that La denotes a length of the assembly 10 along the arrangement direction of the winding portions 21, 22, Lb denotes a length of the assembly 10 along the axial directions of the winding portions 21, 22 and Lc denotes a length of the assembly 10 along a direction orthogonal to both the arrangement direction and the axial directions. An installation area in the case of the vertically stacked type is about Lb×Lc. An installation area in the case of the horizontally placed type is about La×Lb. Therefore, if Lc<La, the installation area in the case of the vertically stacked type is smaller than that in the case of the horizontally placed type.

(c) In a reactor of the vertically stacked type, it may be possible to reduce a height of the case as compared to a reactor 1B of the second embodiment which is of an upright type to be described later. If this is explained using the above lengths La to Lc, a height of the reactor 1A is smaller than that of the reactor 1B if La<Lb.

<Heat Dissipation>

(A) Since the aforementioned intervals between the outer peripheral surfaces of the assembly 10 and the inner surfaces of the case 5 are small, the heat of the assembly 10 is easily transferred to the case 5. In this example, the outer peripheral surfaces of the winding portions 21, 22 and the inner wall surfaces 523, 524 and the inner bottom surface 510 of the case 5 are substantially parallel. Thus, the reactor 1A has wide regions where the above intervals are small, wherefore the heat of the coil 2 and the like are easily transferred to the case 5.

(B) The vertically stacked type easily ensures large areas of the both winding portions 21, 22 facing the inner surfaces of the case 5 as compared to the horizontally placed type. In particular, in the reactor of the horizontally placed type, a total of four surfaces including two surfaces of the both winding portions parallel to the arrangement direction and surfaces located on both sides in the arrangement direction of the winding portions face the inner surfaces of the case. In contrast, in the reactor of the vertically stacked type, a total of five surfaces including four surfaces of the both winding portions 21, 22 parallel to the arrangement direction, i.e. surfaces on the front and back sides of the plane of FIG. 1A, and one surface, i.e. the lower surface in FIG. 1A, of one winding portion 21 respectively face the inner wall surfaces 523, 524 and the inner bottom surface 510 of the case 5. That is, an area of parts where the flat surfaces are facing each other is larger in the reactor of the vertically stacked type than in the reactor of the horizontally placed type. Thus, the vertically stacked type can increase a heat dissipation area of the coil 2 to the case 5 more than the horizontally placed type. In such a reactor of the vertically stacked type, the case 5 can be utilized as a heat dissipation path.

(C) In the reactor of the vertically stacked type, the one surface, i.e. the lower surface in FIG. 1A, of the one winding portion 21 is proximate to the inner bottom surface 510 of the case 5. Thus, the heat of the assembly 10, particularly the heat of the coil 2, is transferred to the bottom portion 51 of the case 5. For example, if the bottom portion 51 of the case 5 is cooled by a cooling mechanism or the like, the heat of the coil 2 is easily transferred to the cooling mechanism outside the case 5 via the bottom portion 51. Since the reactor 1A of this example includes the adhesive layer 9 to join the assembly 10 and the inner bottom surface 510, the heat of the assembly 10, particularly the heat of the coil 2, is easily transferred to the bottom portion 51.

(D) Since the leaf spring fitting 7 includes the lowermost points of the curved part thereof as the pressing part for pressing the assembly 10, the assembly 10 is satisfactorily pressed toward the inner bottom surface 510 of the case 5. By this pressing, the heat of the assembly 10, particularly the heat of the coil 2, is transferred to the bottom portion 51 of the case 5. Therefore, if the bottom portion 51 of the case 5 is cooled by the cooling mechanism or the like as described above, the heat of the coil 2 is easily transferred to the cooling mechanism or the like outside the case 5 via the bottom portion 51.

(E) In the reactor 1A of this example, the leaf spring fitting 7 has the inclined surfaces 77 on the end parts 71, 72. Thus, the leaf spring fitting 7 is easily curved to be convex on the side facing the inner bottom surface 510 of the case 5. Further, the tips including the inclined surfaces 77 bite into the inner wall surfaces 521, 522 of the case 5. Thus, the leaf spring fitting 7 can easily maintain the state supported on the inner peripheral surfaces of the case 5 and can satisfactorily maintain the state where the assembly 10 is pressed toward the inner bottom surface 510. Also from this, the reactor 1A is more excellent in heat dissipation.

(F) In the reactor 1A of this example, the leaf spring fitting 7 includes the projections 73. Thus, the leaf spring fitting 7 more reliably presses the assembly 10 toward the inner bottom surface 510 by the projections 73. Also from this, the reactor 1A is more excellent in heat dissipation.

Also in the reactor 1A of the first embodiment, the leaf spring fitting 7 presses the assembly 10 toward the inner bottom surface 510 of the case 5. Further, the leaf spring fitting 7 is supported in the curved state by being directly pressed against the inner wall surfaces 521, 522 of the case 5. Thus, although the case 5 does not include mounting bases or the like to be bolted and the leaf spring fitting 7 is not fixed to the case 5 by bolts in the reactor 1A, the detachment of the assembly 10 from the case 5 can be prevented. In the reactor 1A of this example, the sealing resin portion 6 embeds the assembly 10 and the leaf spring fitting 7. Thus, the state where the leaf spring fitting 7 is supported in the curved state by the case 5 and the state where the assembly 10 is pressed by the leaf spring fitting 7 are easily maintained also by the sealing resin portion 6.

Further, since the leaf spring fitting 7 presses the assembly 10 toward the inner bottom surface 510 of the case 5, even if such a stress as to remove the sealing resin portion 6 from the case 5 acts on the sealing resin portion 6, the detachment of the assembly 10 from the case 5 together with the sealing resin portion 6 is prevented. The detachment of the assembly 10 from the case 5 is also easily prevented since the reactor 1A of this example includes the adhesive layer 9 to join the assembly 10 and the inner bottom surface 510. Moreover, the case 5 can be made deeper in the reactor of the vertically stacked type than in the reactor of the horizontally placed type. Also from this, the detachment of the assembly 10 from the case 5 is easily prevented.

Furthermore, since the leaf spring fitting 7 is directly supported by the case 5 in the reactor 1A of the first embodiment, bolts and a fastening step can be omitted. Thus, the reactor 1A has a small number of components to be assembled and is also excellent in assembling workability.

Besides, the reactor 1A of this example includes the holding members 4 and the leaf spring fitting 7 indirectly presses the outer core portions 33. Thus, the reactor 1A is excellent in electrical insulation between the assembly 10 and the leaf spring fitting 7.

Second Embodiment

The reactor 1B of the second embodiment is described below mainly with reference to FIG. 4.

The reactor 1B of the second embodiment has a basic configuration similar to that of the reactor 1A of the first embodiment and includes a coil 2, a magnetic core 3, a case 5, a leaf spring fitting 7 and a sealing resin portion 6. The case 5 includes an opening 55 having a rectangular planar shape (see FIG. 2). The leaf spring fitting 7 is supported in a state curved toward an inner bottom surface 510 of the case 5 by having both end parts 71, 72 directly pressed against parts of the case 5 facing each other in a long side direction, here against inner wall surfaces 521, 522. The long side direction is along a lateral direction on the plane of FIG. 4. By such a leaf spring fitting 7, an assembly 10 is pressed toward the inner bottom surface 510 of the case 5. Besides, in the reactor 1B of this example, the assembly 10 includes holding members 4 and resin molded portions 8 and an adhesive layer 9 is provided in the case 5 as in the first embodiment.

The reactor 1B of the second embodiment differs from the reactor 1A of the first embodiment in an accommodated state of the assembly 10 in the case 5, the shape of the leaf spring fitting 7, supported and pressed parts of the leaf spring fitting 7 by the case 5 and the like. The following description is centered on points of different from the first embodiment and the same configuration and effects as those of the first embodiment are not described in detail.

<Accommodated State of Assembly>

The reactor 1B of the second embodiment is of the upright type including two winding portions 21, 22. That is, the respective winding portions 21, 22 are so arranged in the case 5 that axial directions of the both winding portions 21, 22 are along a depth direction of the case 5. Thus, the both winding portions 21, 22 provided in the reactor 1B are so arranged in the case 5 that the axial directions are orthogonal to the inner bottom surface 510 of the case 5 and an arrangement direction of the both winding portions 21, 22 is parallel to the inner bottom surface 510. The axial directions of the winding portions 21, 22 are along a vertical direction on the plane of FIG. 4.

In a reactor of the upright type, it may be possible to reduce an installation area more than reactors of the horizontally placed type and further the aforementioned vertically stacked type. Specifically, an installation area in the case of the upright type is about La×Lc when being described using the aforementioned lengths La to Lc of the assembly 10. Accordingly, if La<Lb, the installation area in the case of the upright type is smaller than that of the reactor of the vertically stacked type.

Further, the upright type more easily ensures a larger heat dissipation area of the coil 2 to the case 5 than the horizontally placed type and further the aforementioned vertically stacked type. In the reactor of the upright type, substantially all the outer peripheral surfaces of the both winding portions 21, 22 are surrounded by the inner peripheral surfaces of a side wall portion 52 of the case 5. In particular, a total of six surfaces including four surfaces of the winding portions 21, 22 parallel to the arrangement direction and one surface in the arrangement direction of each winding portion 21, 22 respectively face the inner wall surfaces 521 to 524 of the case 5. Since an area of parts where the flat surfaces are facing each other is larger than in the reactor of the vertically stacked type, the heat of the coil 2 is more easily transferred to the side wall portion 52. For example, if a cooling mechanism is arranged in proximity to the side wall portion 52 of the case 5, the heat of the coil 2 is easily transferred to the cooling mechanism outside the case via the side wall portion 52. Further, in the reactor of the upright type, the case 5 can be made deeper than in the reactor of the horizontally placed type. In this respect, the detachment of the assembly 10 from the case 5 is easily prevented. Note that the aforementioned four surfaces of the winding portions 21, 22 are surfaces on front and back sides of the plane of FIG. 4. The aforementioned surfaces in the arrangement direction of the winding portions 21, 22 are respectively the left surface of the winding portion 21 and the right surface of the winding portion 22 in FIG. 4.

<Leaf Spring Fitting>

The leaf spring fitting 7 provided in the second embodiment does not include the inclined surfaces 77 and the projections 73 described in the first embodiment. The leaf spring fitting 7 of this example is a flat strip plate having a uniform thickness and a uniform width over the entire length thereof.

Further, in the leaf spring fitting 7 provided in the second embodiment, it is assumed that an actual length of the leaf spring fitting 7 at a room temperature $T_r$ is longer than a long side length of the opening 55 of the case 5 at the room temperature $T_r$. In addition, it is assumed that an apparent length of the leaf spring fitting 7 at the room temperature $T_r$ is equal to or longer than the long side length of the opening 55 of the case 5 at the room temperature $T_r$ with the leaf spring fitting 7 supported in the curved state by the case 5. The leaf spring fitting 7 is constituted by the strip plate satisfying the above specific actual length and apparent length. The leaf spring fitting 7 satisfying the above specific actual length and apparent length reliably has a curved part in a state supported in the case 5. Even if the case 5 thermally expands or shrinks in a manufacturing process of the reactor 1B as described above, the leaf spring fitting 7 is finally supported in the curved state by the case 5. Thus, the leaf spring fitting 7 can exhibit a biasing force for pressing the assembly 10.

Further, the apparent length of the leaf spring fitting 7 at the room temperature $T_r$ may be equal to or longer than the long side length of the opening 55 of the case 5 at a maximum temperature of the case 5 in the manufacturing process of the reactor 1B. That is, the apparent length of the leaf spring fitting 7 at the room temperature $T_r$ may be equal to or longer than the longest long side length of the opening 55 due to the thermal expansion of the case 5. The maximum temperature may be typically the aforementioned temperature T6 for curing a raw material resin 60 of the sealing resin portion 6. In such a leaf spring fitting 7, the actual length at the room temperature $T_r$ is longer than the long side length of the opening 55 at the room temperature $T_r$. Thus, the leaf spring fitting 7 reliably has the curved part in the state supported in the case 5 and can exhibit the biasing force for pressing the assembly 10.

The reactor 1B of the second embodiment including such a leaf spring fitting 7 can be manufactured by the aforementioned method (ii). For example, the leaf spring fitting 7 at the room temperature $T_r$ is pushed into the case 5 at the room temperature $T_r$ to be convex on the side facing the inner bottom surface 510 of the case 5. If the both end parts 71, 72 of the leaf spring fitting 7 are supported on the inner wall surfaces 521, 522, the leaf spring fitting 7 is maintained in the curved state by the inner wall surfaces 521, 522.

<<Support by Case>>>

Figure 5:
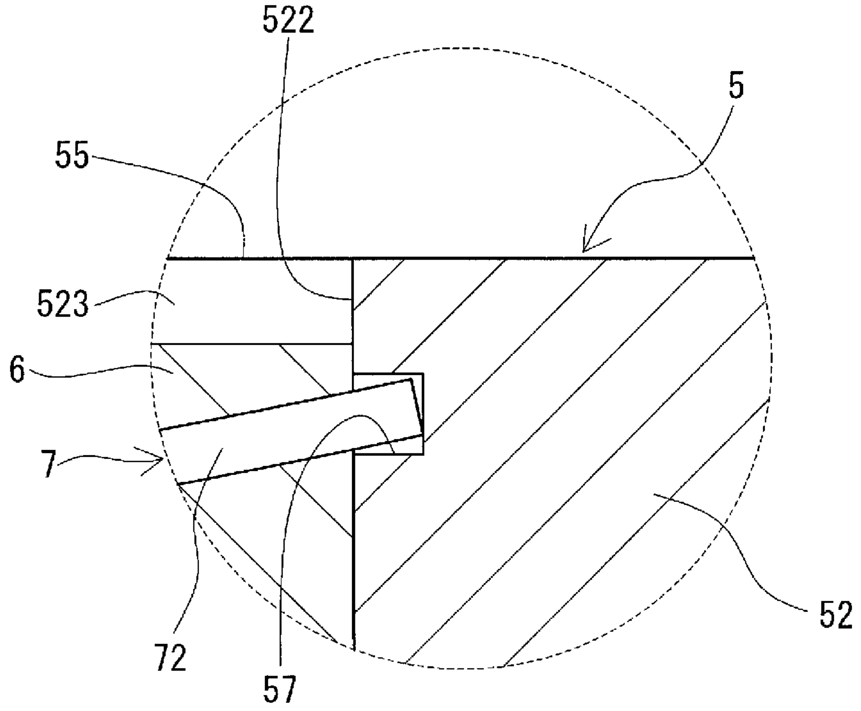
FIG. 5 is a section enlargedly showing the inside of a broken-line circle V shown in FIG. 4.

The case 5 of this example includes recesses 57 respectively in the inner wall surfaces 521, 522 for pressing the leaf spring fitting 7 (see also FIG. 5). The end parts 71, 72 of the leaf spring fitting 7 are accommodated into the respective recesses 57. By fitting the respective end parts 71, 72 into the recesses 57, the leaf spring fitting 7 is reliably supported on the inner wall surfaces 521, 522. Thus, even without having the aforementioned inclined surfaces 77, the leaf spring fitting 7 is unlikely to be shifted in position and detached from the case 5 and maintained in a state pressed from the inner wall surfaces 521, 522 over a long period of time. Therefore, the leaf spring fitting 7 can maintain a state where the assembly 10 is pressed toward the inner bottom surface 510 of the case 5 over a long period of time.

Further, in this example, the sealing resin portion 6 embeds the assembly 10 and the leaf spring fitting 7. Thus, the sealing resin portion 6 is partially filled into clearances to the leaf spring fitting 7 in the recesses 57, wherefore the leaf spring fitting 7 and the assembly 10 are unlikely to be detached from the case 5. Further, the curved state of the leaf spring fitting 7 is easily maintained by the sealing resin portion 6.

<<Pressing Part>>>

Figure 4:
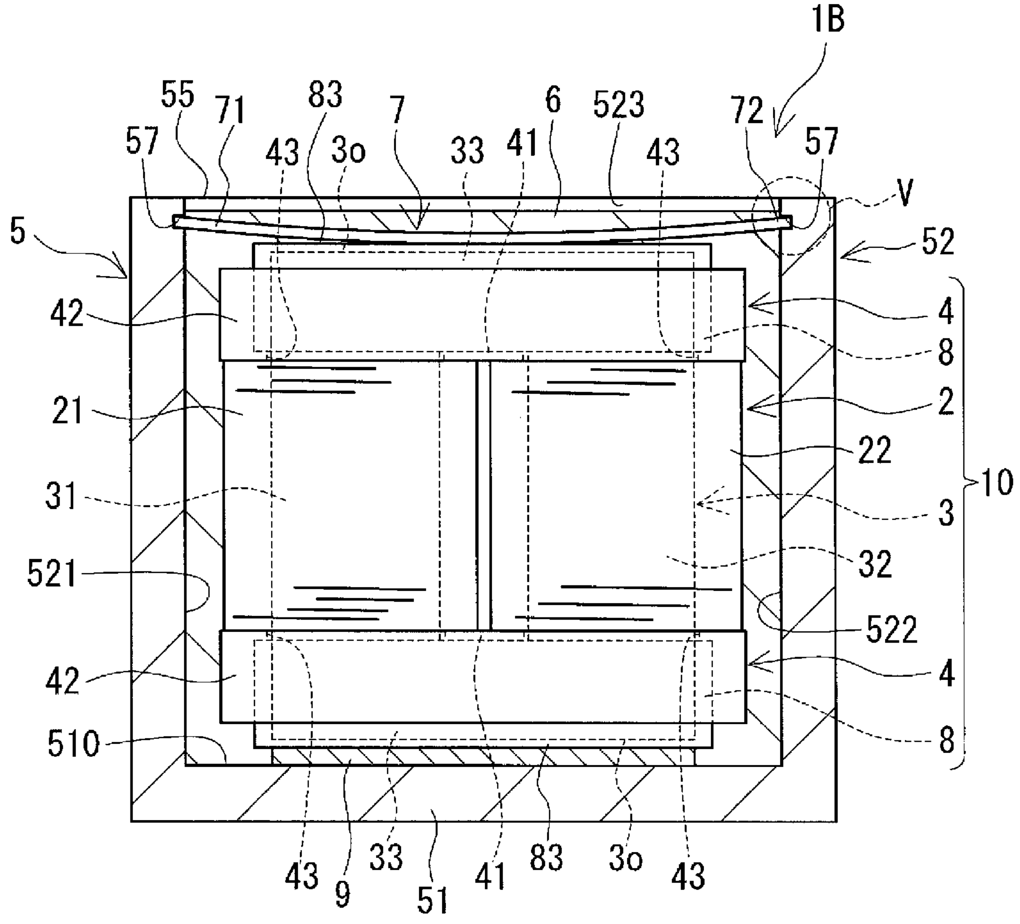
FIG. 4 is a schematic configuration diagram showing a reactor of a second embodiment with a case partially cut.

The leaf spring fitting 7 provided in the second embodiment is arcuately curved and supported by the case 5 as shown in FIG. 4. In the leaf spring fitting 7, a lowermost point in the depth direction of the case 5 and the vicinity thereof in this arcuately curved part serve as the pressing part for pressing the assembly 10.

Here, the reactor 1B is of the upright type. Thus, a part of the assembly 10 located on the side of the opening 55 of the case 5 in the state accommodated in the case 5 is one outer core portion 33 of the magnetic core 3. Thus, the leaf spring fitting 7 presses an outer end surface 3*o* of the outer core portion 33 located on the side of the opening 55. In particular, the leaf spring fitting 7 presses a part of the outer end surface 3*o* of the outer core portion 33 on the side of the opening 55 near a center position in the long side direction of the opening 55. That is, in the reactor of the upright type, the leaf spring fitting 7 is arranged over the entire length in the long side direction of the opening 55 of the case 5, but does not contact the coil 2. Therefore, the reactor 1B of the second embodiment is excellent in electrical insulation between the coil 2 and the leaf spring fitting 7.

The reactor 1B of this example includes the resin molded portions 8. Thus, the leaf spring fitting 7 indirectly presses the outer end surface 3*o* via an outer resin portion 83 covering the outer end surface 3*o* of the outer core portion 33. Due to the outer resin portion 83, the reactor 1B is excellent in electrical insulation between the assembly 10 and the leaf spring fitting 7.

Note that the resin molded portions 8 may be omitted or the outer end surface 3*o* of the outer core portion 33 may be at least partially exposed from the resin molded portion 8 and the leaf spring fitting 7 may directly press the outer core portion 33.

<<Other Configuration>>>

Besides, the reactor 1B is of the upright type. Thus, the other outer core portion 33 of the magnetic core 3 in a state accommodated in the case 5 is located on the side of the inner bottom surface 510 of the case 5. In the reactor 1B of this example, the outer resin portion 83 of the resin molded portion 8 covering the outer end surface 3*o* of the other outer core portion 33 and the inner bottom surface 510 are bonded by the adhesive layer 9. A bonding region with the inner bottom surface 510 is constituted by one outer end surface 3*o* in the assembly 10, whereby the reactor 1B easily maintains a stable bonded state.

<<Modification>>

The case 5 may include the recesses 57 in both the inner wall surfaces 521, 522 and the both end parts 71, 72 of the leaf spring fitting 7 may have inclined surfaces 77. Alternatively, one inner wall surface 521 may include the recess 57, and the other inner wall surface 522 may not include the recess 57. At this time, the end part 71 to be fit into the recess 57 may not have the inclined surface 77. Only the end part 72 to be supported on the other inner wall surface 522 including no recess 57 may have the inclined surface 77.

Third Embodiment

Figure 6:
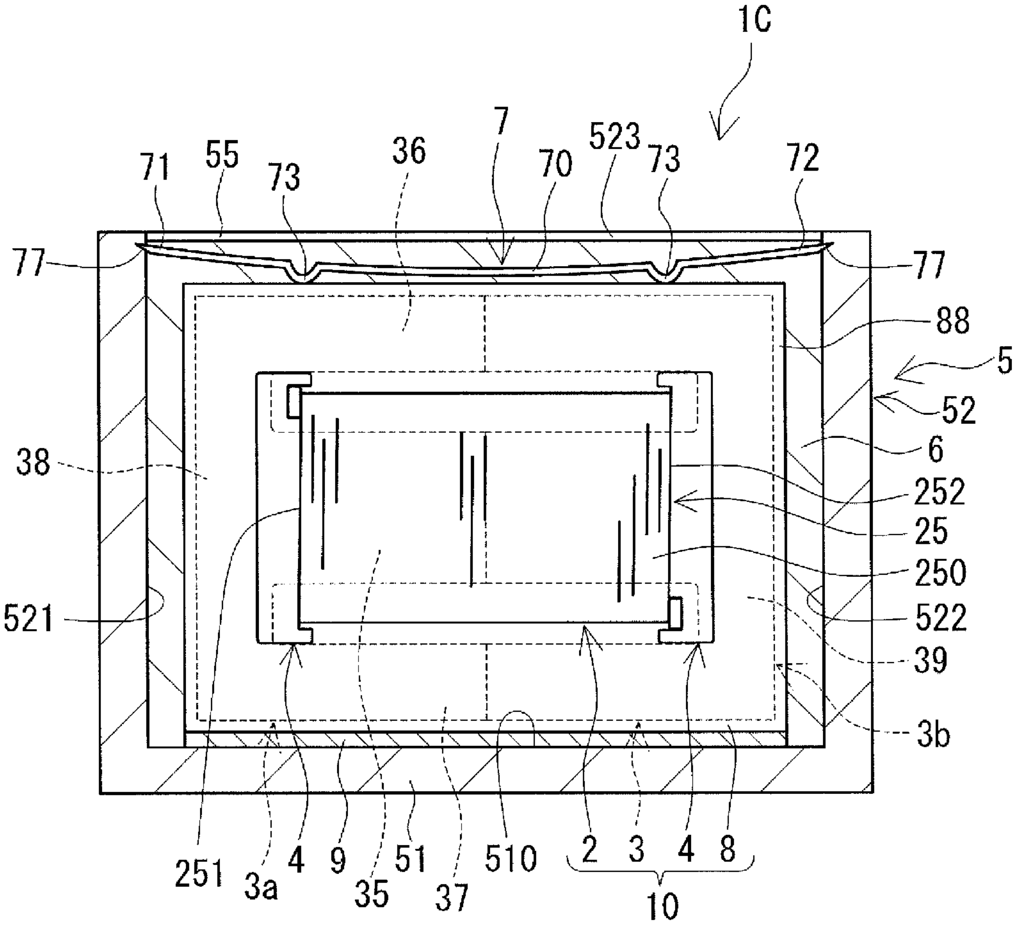
FIG. 6 is a schematic configuration diagram showing a reactor of a third embodiment with a case partially cut.

A reactor 1C of the third embodiment is described below mainly with reference to FIG. 6.

In the reactor 1C of the third embodiment, the shape of a leaf spring fitting 7 and supported and pressed states of the leaf spring fitting 7 by a case 5 are similar to those of the reactor 1A of the first embodiment of the vertically stacked type. The reactor 1C of the third embodiment mainly differs from the first embodiment in the structure of an assembly 10. In the assembly 10 provided in the reactor 1C, one winding portion is provided instead of two winding portions.

The reactor 1C of the third embodiment is outlined below. Thereafter, the description is centered on points of difference from the first embodiment and the same configuration and effects as those of the first embodiment are not described in detail.

Note that, similarly to FIG. 1A, FIG. 6 and FIG. 7 to be described later are sections obtained by cutting a part of the case 5 having inner wall surfaces 521, 522 and near the inner wall surface 524 shown in FIG. 2 along a plane parallel to a depth direction of the case 5. See the cutting line A-A shown in FIG. 2 for a cutting line.

SUMMARY

The reactor 1C of the third embodiment includes a coil 2, a magnetic core 3, the case 5, the leaf spring fitting 7 and a sealing resin portion 6. The case 5 includes an opening 55 having a rectangular planar shape. In this example, each of both end parts 71, 72 of the leaf spring fitting 7 has an inclined surface 77. Tips having the inclined surfaces 77 bite into the inner wall surfaces 521, 522 facing each other in a long side direction in the case 5, whereby the both end parts 71, 72 are directly pressed against the inner wall surfaces 521, 522. By this pressing, the leaf spring fitting 7 is supported in a state curved toward the inner bottom surface 510 of the case 5. The assembly 10 is pressed toward the inner bottom surface 510 by the leaf spring fitting 7. In this example, a pressing part of the leaf spring fitting 7 includes projections 73. Besides, an adhesive layer 9 is provided between the assembly 10 and the inner bottom surface 510 in this example.

The assembly 10 provided in the reactor 1C includes the coil 2, the magnetic core 3, holding members 4 and a resin molded portion 8.

<Coil>

The coil 2 of this example includes one winding portion 25. The winding portion 25 of this example is an edge-wise coil in the form of a rectangular tube formed by spirally winding one continuous coated flat rectangular wire. Thus, the coil 2 has four substantially flat surfaces as outer peripheral surfaces 250 of the winding portion 25. Further, the coil 2 has rectangular frame-like end surfaces 251, 252. Note that the outer peripheral surfaces 250 are surfaces substantially parallel to an axial direction of the winding portion 25. The end surfaces 251, 252 are surfaces substantially orthogonal to the axial direction.

Some of the four surfaces constituting the outer peripheral surfaces 250 of the winding portion 25 are not sandwiched by outer leg portions 36, 37 of the magnetic core 3 to be described later and not covered by these. The remaining outer peripheral surfaces 250 are sandwiched by the outer leg portions 36, 37 and covered by these. FIG. 6 shows one of the four surfaces. Out of the four surfaces, the remaining two surfaces, i.e. upper and lower surfaces in FIG. 6, are covered by the outer leg portions 36, 37.

An unillustrated external device such as a power supply is connected to end parts of the winding wire pulled out from the winding portion 25. The winding wire is not shown in detail.

<Magnetic Core>

The magnetic core 3 is arranged inside and outside the winding portion 25 and forms an annular closed magnetic path. The magnetic core 3 includes one inner leg portion 35, two outer leg portions 36, 37 and two coupling portions 38, 39. The inner leg portion 35 is arranged inside the winding portion 25. The outer leg portions 36, 37 and the coupling portions 38, 39 are arranged outside the winding portion 25. The outer leg portions 36, 37 sandwich some of the outer peripheral surfaces 250 of the winding portion 25. In this example, the outer leg portions 36, 37 sandwich two facing surfaces, i.e. the upper and lower surfaces in FIG. 6, out of the four surfaces constituting the outer peripheral surfaces 250, but do not sandwich the remaining two surfaces. The coupling portions 38, 39 sandwich the respective end surfaces 251, 252 of the winding portion 25.

In this example, the inner leg portion 35 is in the form of a rectangular parallelepiped having an outer peripheral shape corresponding to an inner peripheral shape of the winding portion 25 and outside dimensions corresponding to inside dimensions of the winding portion 25. The outer leg portions 36, 37 and the coupling portions 38, 39 are also in the form of rectangular parallelepipeds. Out of outer peripheral surfaces of the outer leg portions 36, 37 and the coupling portion 38, 39, surfaces on a front side of the plane of FIG. 6 are flush with each other. Surfaces on a back side of the plane of FIG. 6 facing those on the front side of the plane of FIG. 6 are also flush with each other. Thus, out of the outer peripheral surfaces 250 of the winding portion 25, the two surfaces not sandwiched by the outer leg portions 36, 37, i.e. the surfaces on the front and back sides of the plane of FIG. 6, respectively project further than the surfaces on the front and back sides of the plane of FIG. 6 in the outer leg portions 36, 37 and the coupling portions 38, 39. In this respect, the two surfaces not sandwiched by the outer leg portions 36, 37, out of the outer peripheral surfaces 250 of the winding portion 25, can be proximate to the inner wall surfaces 521, 522 of the case 5.

The magnetic core 3 of this example includes two E-shaped core pieces 3*a*, 3*b*. The respective core pieces 3*a*, 3*b* have the same shape and the same size. The core piece 3*a* includes the coupling portion 38 and three leg pieces. The three leg pieces are respectively half of the inner leg portion 35, half of the outer leg portion 36 and half of the outer leg portion 37. Further, the three leg pieces stand from the coupling portion 38 and are arranged apart from each other in an axial direction of the coupling portion 38. The core piece 3*b* includes the coupling portion 39 and three leg pieces, which are the remaining halves of the inner leg portion 35 and the outer leg portions 36, 37. The three leg pieces stand from the coupling portion 39 and are arranged apart from each other in an axial direction of the coupling portion 39.

<Holding Members>

The holding members 4 provided in the reactor 1C are utilized to support the winding portion 25 and the core pieces 3*a*, 3*b* and position the core pieces 3*a*, 3*b* with respect to the winding portion 25. The holding members 4 are not shown in detail.

The holding members 4 of this example are frame-like members arranged on the sides of the respective end surfaces 251, 252 of the winding portion 25. Each holding member 4 has the same basic configuration. Thus, the holding member 4 arranged on the side of the end surface 251 is described as a representative. The holding member 4 includes a frame plate portion and a projecting piece extending from the frame plate portion. The frame plate portion is arranged between the end surface 251 of the winding portion 25 and the inner surface of the coupling portion 38 of the core piece 3*a*. Further, the frame plate portion includes a through hole into which an end part of the inner leg portion 35 is inserted. The projecting piece is inserted in a part of a space between the winding portion 25 and the inner leg portion 35. Thus, clearances corresponding to a thickness of the projecting piece are provided in the remaining parts of the space between the winding portion 25 and the inner leg portion 35. A constituting resin of the resin molded portion 8 is filled into these clearances.

<Resin Molded Portion>

The resin molded portion 8 provided in the reactor 1C is an integrally molded article including an unillustrated inner resin portion and an outer resin portion 88. The inner resin portion is provided between the winding portion 25 and the inner leg portion 35 and at least partially covers the inner leg portion 35. The outer resin portion 88 at least partially covers the outer leg portions 36, 37 and the coupling portions 38, 39. In this example, the outer resin portion 88 continuously covers the outer leg portion 36, the coupling portion 38, the outer leg portion 37 and the coupling portion 39 including connecting parts of the core pieces 3*a*, 3*b*. Such an outer resin portion 88 contributes to integrally holding the core pieces 3*a*, 3*b*. Further, the outer resin portion 88 constitutes the outer peripheral surfaces of the assembly 10. Note that the resin molded portion 8 does not cover two facing surfaces, i.e. the surfaces on the front and back sides of the plane of FIG. 6, out of the outer peripheral surfaces 250 of the winding portion 25.

<Arrangement Mode>

The reactor 1C of the third embodiment is of a leg vertically stacked type. That is, the assembly 10 is so accommodated into the case 5 that the axial direction of the winding portion 25 is orthogonal to the depth direction of the case 5 and an arrangement direction of the outer leg portion 36, the inner leg portion 35 and the outer leg portion 37 is along the depth direction of the case 5. The axial direction is along a lateral direction on the plane of FIG. 6. The depth direction and the arrangement direction are along a vertical direction on the plane of FIG. 6.

In the reactor of the leg vertically stacked type, parts not covered by the magnetic core 3, out of the outer peripheral surfaces 250 of the winding portion 25, are arranged to face the inner wall surfaces of the case 5. In this example, out of the outer peripheral surfaces 250 of the winding portion 25, the two facing surfaces, i.e. the surfaces on the front and back sides of the plane of FIG. 6, respectively face the inner wall surfaces 523, 524 and are arranged in proximity to those. That is, out of the outer peripheral surfaces 250 of the winding portion 25, the above two surfaces are sandwiched by two inner wall surfaces 523, 524.

Further, in the reactor of the leg vertically stacked type, parts of the assembly 10 located on the side of the opening 55 of the case 5 in the state accommodated in the case 5 are parts of one outer leg portion 36 and the coupling portions 38, 39 of the magnetic core 3. Thus, the leaf spring fitting 7 presses parts of the magnetic core 3. Specifically, the leaf spring fitting 7 presses at least parts of the outer leg portion 36 and the coupling portions 38, 39 located on the side of the opening 5, out of the magnetic core 3. That is, in the reactor of the leg vertically stacked type, the leaf spring fitting 7 is arranged over the entire length in the long side direction of the opening 55 of the case 5, but does not contact the coil 2. Further, in this example, the leaf spring fitting 7 does not directly press the magnetic core 3, but indirectly presses a part of the magnetic core 3 covered by the resin molded portion 8.

In particular, in this example, the projections 73, which are lowermost points in the curved part in the depth direction of the case 5, of the leaf spring fitting 7 press the parts of the outer leg portion 36 near the coupling portions 38, 39 and covered by the outer resin portion 88.

Besides, in the reactor of the leg vertically stacked type, the other outer leg portion 37 is located on the side of the inner bottom surface 510 of the case 5. Thus, in this example, the outer leg portion 37 and the inner bottom surface 510 are bonded by the adhesive layer 9.

Effects

The reactor 1C of the third embodiment is small in size and excellent in heat dissipation for the following reasons.

<Small Size>

(a) As in the first embodiment, the case 5 does not include mounting bases to which the leaf spring fitting 7 are bolted. Thus, intervals between the outer peripheral surfaces of the assembly 10 and the inner surfaces of the case 5 are easily reduced.

(b) Since the reactor 1C is of the leg vertically stacked type, it may be possible to reduce an installation area as compared to a reactor of the horizontally placed type. Specifically, it is assumed that La denotes a length of the assembly 10 along the arrangement direction of the inner leg portion 35 and the outer leg portions 36, 37, Lb denotes a length of the assembly 10 along the axial direction of the winding portion 25 and Lc denotes a length of the assembly 10 along a direction orthogonal to both the arrangement direction and the axial direction. An installation area in the case of the leg vertically stacked type is about Lb×Lc. An installation area in the case of the horizontally placed type is about La×Lb. Therefore, if Lc<La, the installation area in the case of the leg vertically stacked type is smaller than that in the case of the horizontally placed type.

(c) In a reactor of the leg vertically stacked type, it may be possible to reduce a height of the case 5 as compared to a reactor 1D of the fourth embodiment which is of the upright type to be described later. If this is explained using the above lengths La to Lc, a height of the reactor 1C is smaller than that of the reactor 1D if La<Lb.

<Heat Dissipation>

(A) Since the intervals between the outer peripheral surfaces of the assembly 10 and the inner surfaces of the case 5 are small, the heat of the assembly 10 is easily transferred to the case 5. In this example, the intervals between the above two surfaces, out of the outer peripheral surfaces 250 of the winding portion 25, and the inner wall surfaces 523, 524 of the case 5 are small. Thus, the heat of the coil 2 and the like is easily transferred to a side wall portion 52 of the case 5.

(B) The leg vertically stacked type easily ensures large areas of the winding portion 25 facing the inner surfaces of the case 5 as compared to the horizontally placed type. In particular, in the reactor of the horizontally placed type, only one surface, out of four surfaces constituting outer peripheral surfaces of a winding portion, faces the inner bottom surface of the case. In contrast, in the reactor of the leg vertically stacked type, two surfaces, out of the outer peripheral surfaces 250 of the winding portion 25, respectively face the inner wall surfaces 523, 524 of the case 5. That is, an area of parts where flat surfaces are facing each other is larger in the reactor of the leg vertically stacked type than in the reactor of the horizontally placed type. Thus, the reactor of the leg vertically stacked type has a larger heat dissipation area of the coil 2 to the case 5 than the reactor of the horizontally placed type.

Further, in the reactor 1C of the third embodiment, the detachment of the assembly 10 from the case 5 can be prevented for the following reasons as in the first embodiment.

The leaf spring fitting 7 supported in the curved state by the inner wall surfaces 521, 522 of the case 5 presses the assembly 10 toward the inner bottom surface 510 of the case.

The sealing resin portion 6 embeds the assembly 10 and the leaf spring fitting 7.

In the reactor of the leg vertically stacked type, the case 5 is easily deeper than in the reactor of the horizontally placed type if Lc<La as described above.

In this example, the adhesive layer 9 joins the assembly 10 and the inner bottom surface 510.

Since the tips including the inclined surfaces 77 bite into the inner wall surfaces 521, 522 of the case in this example, the state where the leaf spring fitting 7 is supported in the case 5 is easily maintained.

In this example, the assembly 10 is more reliably pressed toward the inner wall surface 510 of the case 5.

Besides, in the reactor 1C of this example, the leaf spring fitting 7 indirectly presses the outer leg portion 36 of the magnetic core 3 via the outer resin portion 88 of the resin molded portion 8. Thus, the reactor 1C is excellent in electrical insulation between the assembly 10 and the leaf spring fitting 7.

Fourth Embodiment

The reactor 1D of the fourth embodiment is described below mainly with reference to FIG. 7.

A basic configuration of the reactor 1D of the fourth embodiment is similar to that of the reactor 1C of the third embodiment and includes a coil 2, a magnetic core 3, a case 5, a leaf spring fitting 7 and a sealing resin portion 6. The coil 2 includes one winding portion 25. The magnetic core 3 is configured by assembling E-shaped core pieces 3*a*, 3*b*.

However, the reactor 1D of the fourth embodiment is not of the leg vertically stacked type, but of the upright type. Further, in the reactor 1D of the fourth embodiment, the shape of the leaf spring fitting 7 and a supported state and pressing parts by the case 5 are different from those of the third embodiment and similar to those of the second embodiment.

The following description is centered on points of difference from the third embodiment and the same configuration and effects as those of the second and third embodiment are not described in detail.

The reactor 1D of the fourth embodiment is of the upright type. That is, an assembly 10 is so accommodated into the case 5 that an axial direction of the winding portion 25, an axial direction of an inner leg portion 35 and axial directions of both outer leg portions 36, 37 are along a depth direction of the case 5. Out of outer peripheral surfaces 250 of the winding portion 25, facing two surfaces, i.e. surfaces on front and back sides of the plane of FIG. 7, are respectively arranged to face an inner wall surface 523 and an unillustrated inner wall surface 524 of the case 5. Further, the two facing surfaces of the outer peripheral surfaces 250 are respectively arranged in proximity to the inner wall surfaces 523, 524. The axial directions and the depth direction are along a vertical direction on the plane of FIG. 7.

Further, in the reactor of the upright type, a part of the assembly 10 located on the side of an opening 55 of the case 5 in a state accommodated in the case 5 is one coupling portion 39 of the magnetic core 3. Thus, the leaf spring fitting 7 presses the coupling portion 39 constituting a part of the magnetic core 3. In this example, the leaf spring fitting 7 does not directly press the coupling portion 39, but indirectly presses a part of the coupling portion 39 covered by an outer resin portion 88 of a resin molded portion 8.

Note that, in this example, the leaf spring fitting 7 includes no projections 73 and no inclined surfaces 77. The leaf spring fitting 7 is maintained in a state curved toward an inner bottom surface 510 of the case 5 and presses the assembly 10 toward the inner bottom surface 510 by having end parts 71, 72 fit into recesses 57 provided in inner wall surfaces 521, 522 of the case 5.

Besides, in the reactor of the upright type, the magnetic core 3 is so arranged in the case 5 that the inner leg portion 35 and the outer leg portions 36, 37 are orthogonal to the inner bottom surface 510 of the case 5. Further, the other coupling portion 38 is located on the side of the inner bottom surface 510 of the case 5. In this example, the coupling portion 38 and the inner bottom surface 510 are bonded by an adhesive layer 9.

Since the reactor 1D of the fourth embodiment is of the upright type, it may be possible to reduce an installation area more than reactors of the horizontally placed type and further the leg vertically stacked type of the third embodiment. Specifically, an installation area in the case of the upright type is about La×Lc when being described using the aforementioned lengths La to Lc of the assembly 10 described in the third embodiment. Accordingly, if La<Lb, the installation area in the case of the upright type is smaller than that in the case of the leg vertically stacked type of the third embodiment.

Figure 7:
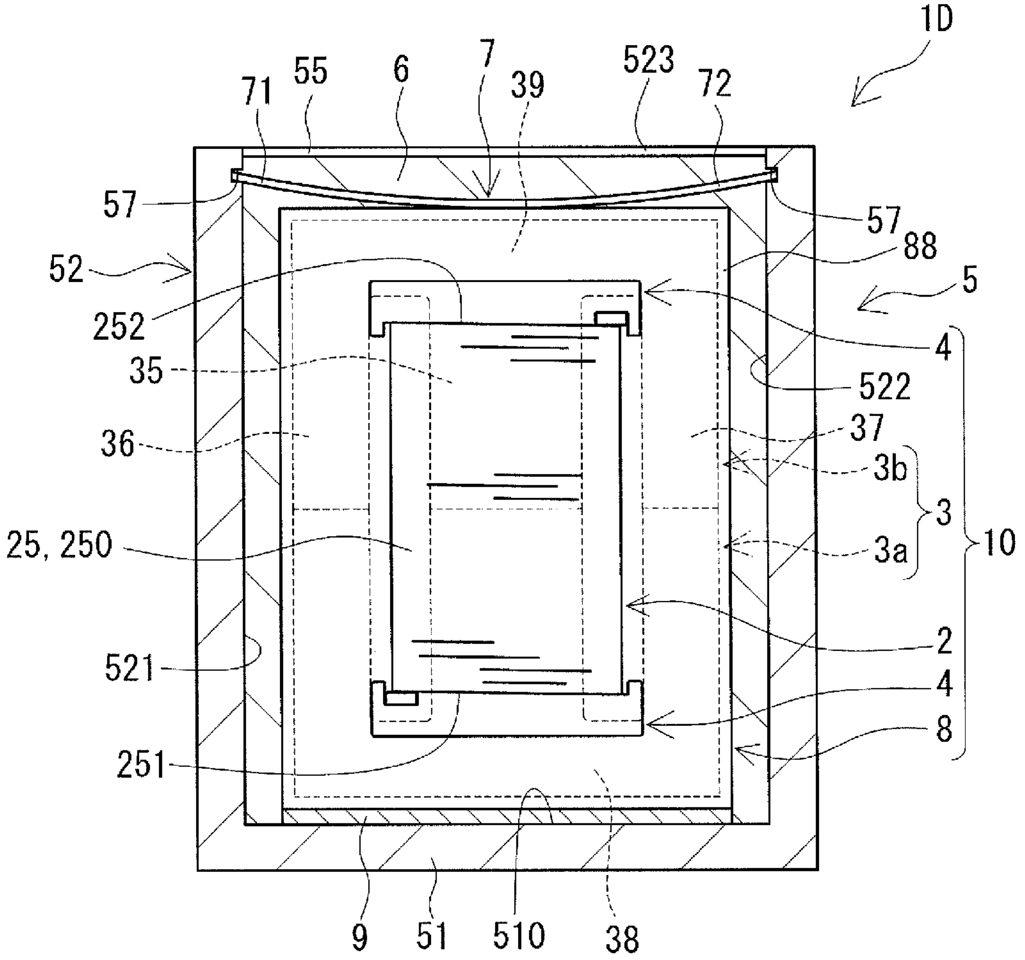
FIG. 7 is a schematic configuration diagram showing a reactor of a fourth embodiment with a case partially cut.

Further, in the reactor 1D of the fourth embodiment, the two flat surfaces, i.e. the surfaces on the front and back sides of the plane of FIG. 7, out of the outer peripheral surfaces 250 of the winding portion 25, and the flat inner wall surface 523, 524 of the case 5 face each other as in the reactor of the leg vertically stacked type of the third embodiment. Thus, a heat dissipation area of the coil 2 to the case 5 is larger than in the reactor of the horizontal placed type.

Further, in the reactor of the upright type, the case 5 can be made deeper as compared to the reactor of the horizontally placed type if Lc<Lb. In this respect, the detachment of the assembly 10 from the case 5 is easily prevented.

(Use Application)

The reactors 1A to 1D of the first to fourth embodiments can be utilized as components of circuits for performing a voltage stepping-up operation and a voltage stepping-down operation, e.g. constituent components of various converters and power converters. Examples of the converters include in-vehicle converters mounted in vehicles such as hybrid vehicles, plug-in hybrid vehicles, electric vehicles and fuel cell vehicles and converters of air conditioners. The in-vehicle converter is typically a DC-DC converter.

The present invention is not limited to these illustrations and is intended to be represented by claims and include all changes in the scope of claims and in the meaning and scope of equivalents.

For example, at least one of the following changes can be made for the reactors 1A to 1D of the above first to fourth embodiments.

(First Modification)

In the first modification, the holding members are omitted.

A specific example in which the holding members are omitted in the case of including two winding portions 21, 22 is described with reference to FIG. 1A. Dimensions of the outer core portions 33 along the arrangement direction of the winding portions 21, 22, i.e. dimensions along the depth direction of the case 5, are so set that the outer peripheral surfaces of the outer core portions 33 are flush with the outer peripheral surfaces of the winding portions 21, 22. By having such large outer core portions 33, the leaf spring fitting 7 can directly press the outer core portions 33 toward the inner bottom surface 510 of the case 5. Insulation tapes or the like may be, for example, attached to contact parts of the outer core portions 33 with the leaf spring fitting 7. In this case, the leaf spring fitting 7 can indirectly press the outer core portions 33 toward the inner bottom surface 510 of the case 5. Further, in this case, electrical insulation between the outer core portions 33 and the leaf spring fitting 7 is enhanced.

In the case of omitting the holding members, electrical insulation between the coil and the magnetic core is enhanced if at least one of the coil and the magnetic core is coated with an electrically insulating material such as a resin. Examples of this includes a mode including a coated coil obtained by covering a coil by a resin portion and a mode including a coated core obtained by covering a magnetic core by a resin molded portion. The coated core can be manufactured, for example, by forming the resin molded portion for the core pieces for constituting the magnetic core and bonding the coated core pieces by an adhesive or the like.

If the holding members are omitted in the case of including two winding portions 21, 22, the pressing part of the leaf spring fitting may include, for example, the followings.

In the reactor of the vertically stacked type, the pressing part includes the coated coil.

If the reactor is of the vertically stacked type or upright type and the outer core portions are indirectly pressed, the pressing part includes the outer core portions covered with the resin.

If the reactor is of the vertically stacked type or upright type and the outer core portions are directly pressed, the pressing part includes the outer core portions not covered with the resin.

(Second Modification)

A coil satisfies at least one of the following configurations (1) to (3).

(1) The shapes, the sizes and the like of a winding wire and a winding portion are different from those of the first to fourth embodiments. The winding portion is, for example, in the form of a hollow cylinder.

(2) In the case of including two winding portions, a coil includes winding portions respectively formed by two independent winding wires. In this case, one end parts, out of both end parts of the winding wire pulled out from each winding portion, are directly or indirectly connected. Welding, crimping or the like can be utilized for direct connection. Suitable fittings or the like to be mounted on the end parts of the winding wires can be utilized for indirect connection.

(3) In the case of including two winding portions, each winding portion has a different specification.

(Third Modification)

A magnetic core satisfies at least one of the following configurations (1) to (4).

(1) Corner parts of a core piece are chamfered. The corner parts of this core piece are hardly chipped and are excellent in strength.

(2) A part of the magnetic core to be arranged inside a winding portion is composed of a plurality of core pieces.

(3) An outer peripheral shape of a part of the magnetic core to be arranged inside a winding portion is not similar to an inner peripheral shape of the winding portion. A specific example of this is that the winding portion is in the form of a rectangular tube and an inner core portion or inner leg portion is in the form of a cylinder.

(4) In the case of including two winding portions, a magnetic core includes a core piece obtained by integrating at least a part of an inner core portion and an outer core portion. Specific examples of the core piece include a U-shaped core piece and an L-shaped core piece.

Fourth Embodiment

A planar shape of an opening of a case is a race track shape, an elliptical shape or the like.

Note that a rectangular planar shape of the opening of the case means such a minimum rectangular shape inscribed on a contour formed by an opening edge of the case that two orthogonal sides of this rectangular shape have different lengths.

LIST OF REFERENCE NUMERALS

1A, 1B, 1C, 1D reactor, 10 assembly
2 coil, 21, 22, 25 winding portion, 23 connecting portion
  250 outer peripheral surface, 251, 252 end surface
3 magnetic core 31, 32 inner core portion, 33 outer core portion
  3*a*, 3*b* core piece, 35 inner leg portion
  36, 37 outer leg portion, 38, 39 coupling portion
  3*e* inner end surface, 3*o* outer end surface
4 holding member, 41 frame plate portion, 42 peripheral wall portion, 43 through hole
5 case
  51 bottom portion, 510 inner bottom surface
  52 side wall portion, 521, 522, 523, 524 inner wall surface
  55 opening, 57 recess
6 sealing resin portion, 60 raw material resin
7 leaf spring fitting, 70 body portion, 71, 72 end part
  73 projection, 77 inclined surface
8 resin molded portion, 83, 88 outer resin portion
9 adhesive layer, 90 adhesive sheet
W1, W5, W7 width, L5, L50 long side length, L7 apparent length

What is claimed is:

1. A reactor, comprising:
a coil including a pair of winding portions arranged in parallel;
a magnetic core to be arranged inside and outside the winding portions;
a case for accommodating an assembly including the coil and the magnetic core;
a leaf spring fitting for pressing the assembly toward an inner bottom surface of the case; and
a sealing resin portion to be filled into the case,
wherein:
each of the winding portions is so arranged that an arrangement direction of the winding portions is along a depth direction of the case,
the case includes an opening having a rectangular planar shape,
the leaf spring fitting is arranged in a state curved toward the inner bottom surface by having both end parts of the leaf spring fitting directly pressed against parts of inner wall surfaces of the case facing each other in a long side direction, and
a pressing part of the leaf spring fitting for pressing the assembly includes a lowermost point of a curved part of the leaf spring fitting in the depth direction of the case.

2. A reactor, comprising:
a coil including a pair of winding portions arranged in parallel;
a magnetic core to be arranged inside and outside the winding portions;
a case for accommodating an assembly including the coil and the magnetic core;
a leaf spring fitting for pressing the assembly toward an inner bottom surface of the case; and
a sealing resin portion to be filled into the case,
wherein:
each of the winding portions is so arranged that an axial direction of each winding portion is along a depth direction of the case,
the case includes an opening having a rectangular planar shape,
the leaf spring fitting is arranged in a state curved toward the inner bottom surface by having both end parts of the leaf spring fitting directly pressed against parts of inner wall surfaces of the case facing each other in a long side direction, and
a pressing part of the leaf spring fitting for pressing the assembly includes a lowermost point of a curved part of the leaf spring fitting in the depth direction of the case.

3. A reactor, comprising:

a coil including one winding portion;

a magnetic core to be arranged inside and outside the winding portion;

a case for accommodating an assembly including the coil and the magnetic core;

a leaf spring fitting for pressing the assembly toward an inner bottom surface of the case; and a sealing resin portion to be filled into the case, wherein:

the magnetic core includes an inner leg portion to be arranged inside the winding portion, two outer leg portions for sandwiching some of outer peripheral surfaces of the winding portion, and two coupling portions for sandwiching end surfaces of the winding portion, the winding portion is so arranged that the outer peripheral surfaces face inner wall surfaces of the case, the case includes an opening having a rectangular planar shape, the leaf spring fitting is arranged in a state curved toward the inner bottom surface by having both end parts of the leaf spring fitting directly pressed against parts of the inner wall surfaces facing each other in a long side direction, and a pressing part of the leaf spring fitting for pressing the assembly includes a lowermost point of a curved part of the leaf spring fitting in the depth direction of the case.

4. The reactor of claim 1, wherein:

each of the both end parts of the leaf spring fitting has an inclined surface, and the inclined surface is inclined to thin the leaf spring fitting from the inner bottom surface side toward the opening side of the case.

5. The reactor of claim 1, wherein:

the leaf spring fitting includes a U-shaped projection locally projecting toward the inner bottom surface, and the pressing part of the leaf spring fitting includes the projection.

6. The reactor of claim 1, wherein the pressing part of the leaf spring fitting includes a part for directly or indirectly pressing a part of the magnetic core to be arranged outside the winding portion(s).

7. The reactor of claim 1, wherein the inner wall surface includes a recess for accommodating at least one end part of the leaf spring fitting.

8. The reactor of claim 1, comprising an adhesive layer to be interposed between the assembly and the inner bottom surface.

9. The reactor of claim 1, comprising a resin molded portion for at least partially covering the magnetic core.

10. The reactor of claim 2, wherein:

each of the both end parts of the leaf spring fitting has an inclined surface, and the inclined surface is inclined to thin the leaf spring fitting from the inner bottom surface side toward the opening side of the case.

11. The reactor of claim 2, wherein:

the leaf spring fitting includes a U-shaped projection locally projecting toward the inner bottom surface, and the pressing part of the leaf spring fitting includes the projection.

12. The reactor of claim 2, wherein the pressing part of the leaf spring fitting includes a part for directly or indirectly pressing a part of the magnetic core to be arranged outside the winding portion(s).

13. The reactor of claim 2, wherein the inner wall surface includes a recess for accommodating at least one end part of the leaf spring fitting.

14. The reactor of claim 2, comprising an adhesive layer to be interposed between the assembly and the inner bottom surface.

15. The reactor of claim 2, comprising a resin molded portion for at least partially covering the magnetic core.

16. The reactor of claim 3, wherein:

each of the both end parts of the leaf spring fitting has an inclined surface, and the inclined surface is inclined to thin the leaf spring fitting from the inner bottom surface side toward the opening side of the case.

17. The reactor of claim 3, wherein:

the leaf spring fitting includes a U-shaped projection locally projecting toward the inner bottom surface, and the pressing part of the leaf spring fitting includes the projection.

18. The reactor of claim 3, wherein the pressing part of the leaf spring fitting includes a part for directly or indirectly pressing a part of the magnetic core to be arranged outside the winding portion(s).

19. The reactor of claim 3, wherein the inner wall surface includes a recess for accommodating at least one end part of the leaf spring fitting.

20. The reactor of claim 3, comprising an adhesive layer to be interposed between the assembly and the inner bottom surface.

21. The reactor of claim 3, comprising a resin molded portion for at least partially covering the magnetic core.

* * * * *